(12) United States Patent
Nakamura

(10) Patent No.: US 12,441,333 B2
(45) Date of Patent: Oct. 14, 2025

(54) INFORMATION PROCESSING DEVICE, INFORMATION PROCESSING METHOD, AND SERVER

(71) Applicants: Nissan Motor Co., Ltd., Kanagawa (JP); RENAULT S.A.S., Boulogne-Billancourt (FR)

(72) Inventor: Mitsunori Nakamura, Kanagawa (JP)

(73) Assignees: Nissan Motor Co., Ltd., Kanagawa (JP); RENAULT S.A.S., Boulogne-Billancourt (FR)

(*) Notice: Subject to any disclaimer, the term of this patent is extended or adjusted under 35 U.S.C. 154(b) by 451 days.

(21) Appl. No.: 17/602,586

(22) PCT Filed: Apr. 9, 2019

(86) PCT No.: PCT/IB2019/000401
§ 371 (c)(1),
(2) Date: Oct. 8, 2021

(87) PCT Pub. No.: WO2020/208387
PCT Pub. Date: Oct. 15, 2020

(65) Prior Publication Data
US 2022/0176975 A1  Jun. 9, 2022

(51) Int. Cl.
*B60W 40/105* (2012.01)
*H04W 4/46* (2018.01)

(52) U.S. Cl.
CPC .......... *B60W 40/105* (2013.01); *H04W 4/46* (2018.02); *B60W 2554/4041* (2020.02); *B60W 2554/4049* (2020.02)

(58) Field of Classification Search
None
See application file for complete search history.

(56) References Cited

U.S. PATENT DOCUMENTS

2006/0270433 A1* 11/2006 Kelton ............... H04W 52/26
455/522
2010/0137005 A1* 6/2010 Zeng ..................... G01S 11/06
455/456.6

(Continued)

FOREIGN PATENT DOCUMENTS

| JP | 2003-188802 A | 7/2003 |
| WO | 2017/159240 A1 | 9/2017 |
| WO | 2018/182706 A1 | 10/2018 |

OTHER PUBLICATIONS

R. Alieiev, T. Hehn, A. Kwoczek and T. Kürner, "Predictive Communication and Its Application to Vehicular Environments: Doppler-Shift Compensation," in IEEE Transactions on Vehicular Technology, vol. 67, No. 8, pp. 7380-7393, Aug. 2018, doi: 10.1109/TVT.2018.2835662. (Year: 2018).*

(Continued)

*Primary Examiner* — Faris S Almatrahi
*Assistant Examiner* — Selena M Jin
(74) *Attorney, Agent, or Firm* — Osha Bergman Watanabe & Burton LLP

(57) ABSTRACT

An information processing device acquires a first future position where the moving object travels in the future; acquires a second future position where another moving object travels in the future; judges a current communication environment with another moving object based on a signal received from another moving object; corrects the current communication environment based on the acquired first future position and the acquired second future position, and judges a future communication environment with another moving object based on the corrected current communication environment.

19 Claims, 18 Drawing Sheets

(56) References Cited

U.S. PATENT DOCUMENTS

| | | | |
|---|---|---|---|
| 2013/0115961 A1* | 5/2013 | Shibayama | H04W 16/18 |
| | | | 455/446 |
| 2014/0336923 A1* | 11/2014 | Hwang | G01C 21/3461 |
| | | | 701/410 |
| 2017/0012698 A1* | 1/2017 | Laufer | H04B 7/18536 |
| 2017/0041760 A1 | 2/2017 | Alieiev et al. | |
| 2018/0070285 A1* | 3/2018 | Benko | H04L 43/0888 |
| 2018/0341004 A1* | 11/2018 | Kautz | G01S 5/0249 |
| 2019/0051179 A1 | 2/2019 | Alvarez et al. | |
| 2019/0075436 A1 | 3/2019 | Yukizaki et al. | |
| 2020/0077278 A1* | 3/2020 | Jornod | H04W 16/18 |
| 2020/0107212 A1* | 4/2020 | Zielinski | H04W 28/021 |
| 2020/0252769 A1* | 8/2020 | Alieiev | G01C 21/3691 |
| 2020/0267573 A1* | 8/2020 | Pfadler | H04W 4/46 |
| 2020/0296597 A1* | 9/2020 | Zielinski | H04W 24/10 |
| 2021/0266715 A1* | 8/2021 | Uchiyama | H04W 4/48 |
| 2021/0297172 A1* | 9/2021 | Jornod | H04B 17/373 |
| 2021/0328694 A1* | 10/2021 | Alieiev | H04L 67/12 |
| 2022/0140873 A1* | 5/2022 | Pfadler | H04B 7/0617 |
| | | | 370/329 |
| 2022/0166510 A1* | 5/2022 | Spagnolini | H04B 10/1123 |

OTHER PUBLICATIONS

P.-J. Wang, C.-M. Li and H.-J. Li, "Influence of the shadowing on the information transmission distance in inter-vehicle communications," 2009 IEEE 20th International Symposium on Personal, Indoor and Mobile Radio Communications, Tokyo, Japan, 2009, pp. 3015-3019, doi: 10.1109/PIMRC.2009.5450288. (Year: 2009).*

T. S. J. Darwish et al; "Reliable Intersection-Based Traffic Aware Routing Protocol for Urban Areas Vehicular Ad Hoc Networks"; IEEE Intelligent Transportation Systems Magazine, vol. 10, No. 1, pp. 60-73; Apr. 2018 (14 pages).

* cited by examiner

1

INFORMATION PROCESSING DEVICE, INFORMATION PROCESSING METHOD, AND SERVER

TECHNICAL FIELD

The present invention relates to an information processing device, an information processing method, and a server.

BACKGROUND ART

Methods are known that transmits and receives a communication packet indicating vehicle data such as position and speed of a vehicle between a plurality of vehicles (Patent Literature 1). Such transmission and reception between a plurality of vehicles is called inter-vehicle communication. The invention described in Patent Literature 1 adopts a wide area transmission cycle longer than a narrow area transmission cycle when a communication quality in inter-vehicle communication is more than or equal to an allowable level, and adopts a second wide area transmission cycle of a value equal to or smaller than the narrow area transmission cycle when the communication quality is less than the allowable level.

CITATION LIST

Patent Literature

Patent Literature 1: International Publication No. 2017/159240

SUMMARY OF INVENTION

Technical Problem

However, even if the communication is possible by inter-vehicle communication (the direct communication), there is a possibility that an intensity of a radio wave becomes weak or a data does not reach due to an influence of buildings and large vehicles on a subsequent route. Patent Literature 1 discloses switching a frequency when a communication environment deteriorates, but does not judge a future communication environment. Therefore, since the invention described in Patent Literature 1 is to be dealt with in accordance with a degree of deterioration of the communication environment in the future after the communication environment deteriorates, there is a possibility that a necessary data cannot be received in a timely manner, and a margin of driving support and automatic driving becomes small.

In view of the foregoing problem, the present invention provides an information processing device, an information processing method, and a server capable of judging the future communication environment.

Solution to Problem

An information processing device according to one aspect of the present invention acquires a first future position where the moving object travels in the future; acquires a second future position where another moving object travels in the future; judges a current communication environment with another moving object based on a signal received from another moving object; corrects the current communication environment based on the acquired first future position and the acquired second future position, and judges a future communication environment with another moving object based on the corrected current communication environment.

Advantageous Effects of Invention

The present invention can judge the future communication environment.

DESCRIPTION OF EMBODIMENTS

Hereinafter, an embodiment of the present invention will be described with reference to the drawings. In the illustration of the drawings, the same constituents are denoted by the same reference signs, and description thereof is omitted.

First Embodiment

Hereinafter, a first embodiment of the present invention will be described with reference to the drawings. In the illustration of the drawings, the same constituents are denoted by the same reference signs, and description thereof is omitted.

Figure 1:
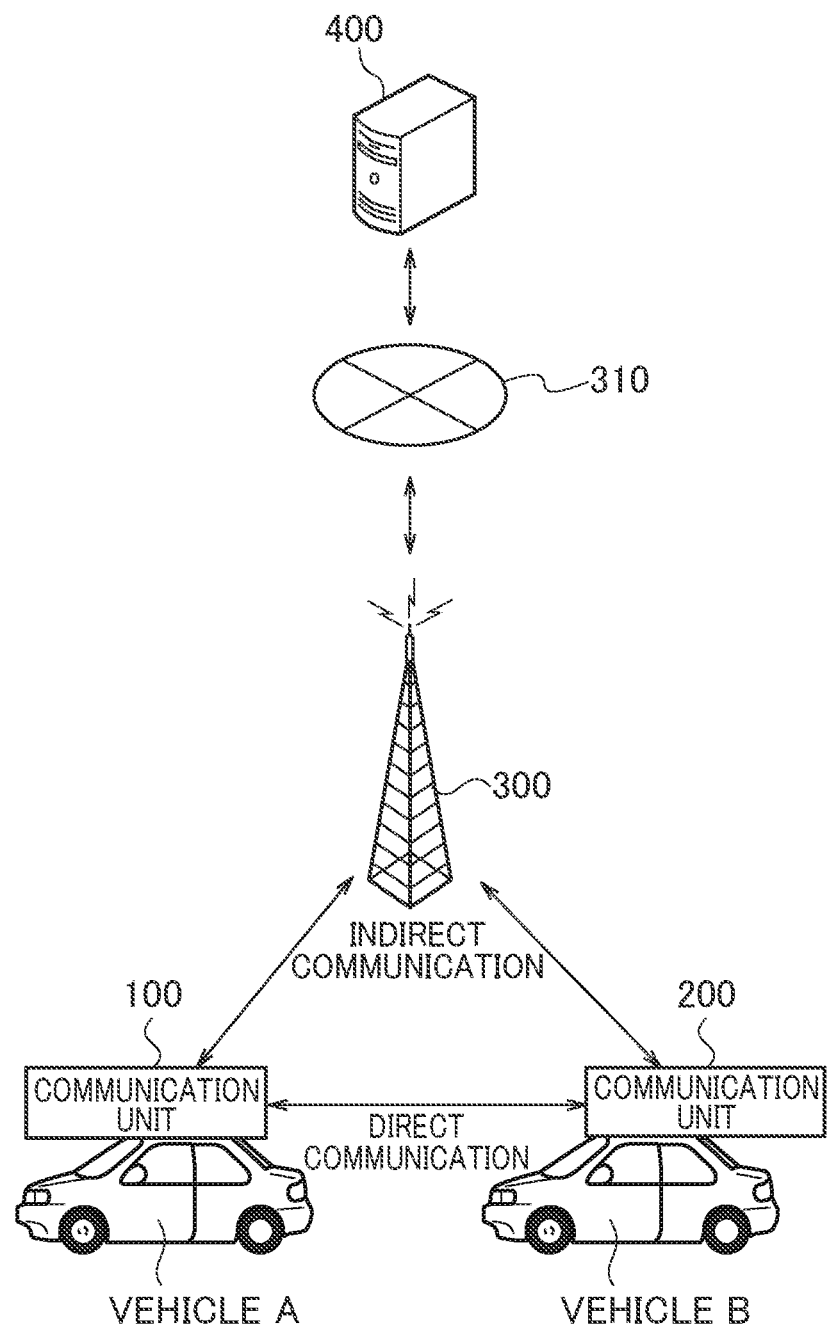
FIG. 1 is a schematic diagram illustrating a communication network according to a first embodiment of the present invention.

An overall outline of a communication network according to the present embodiment will be described with reference to FIG. 1. As shown in FIG. 1, the communication network according to present embodiment includes a vehicle A, a vehicle B, a base station 300, a cellular phone network 310, and a server 400.

The vehicle A (mobile object) comprises a communication unit 100 having a communication function. The vehicle B (other mobile object) comprises a communication unit 200 having a communication function. The communication unit 100 and the communication unit 200 are, for example, an antenna, a modem, an application processor, a memory, and the like. The communication unit 100 and the communication unit 200 communicate via the base station 300 and the cellular phone network 310 with the server 400. The base station 300 is a fixed communication device that does not move and is an access point that covers the cellular phone network 310. The communication unit 100 and the communication unit 200 can communicate with each other via the base station 300 and the server 400. Hereinafter, communication via the base station 300 and the server 400 between the communication unit 100 and the communication unit 200 is defined as indirect communication. In the present embodiment, the indirect communication is performed by using the cellular phone network 310 and a server on an internet network. The server arrangement is not limited thereto, and other wireless communication systems (For example, wifi hotspots, servers on closed networks of cellular phone networks, etc.) may be used.

Further, the communication unit 100 and the communication unit 200 can communicate directly without passing through the base station 300 and the server 400. Such communication that does not pass the base station 300 and the server 400 is defined as the direct communication in the following. The direct communication may be expressed as an inter-vehicle communication. In the present embodiment, the vehicle A and the vehicle B share a plurality of data relating to vehicles (including the vehicle A, the vehicle B, and other vehicles), road information, and the like through the direct communication or the indirect communication. The plurality of data includes positional information, speed information, data related to a traveling direction, and the like. Since the direct communication does not pass the base station 300 and the server 400, the data can be transmitted to the other party with a low delay and a simple configuration. The indirect communication is used to transmit large data that cannot be sent by the direct communication, or to transmit information repeatedly for a certain period of time. The indirect communication is used in cases where the direct communication is not possible.

The vehicles A and B may be vehicles having an autonomous driving function or vehicles not having the autonomous driving function. The vehicles A and B may be vehicles capable of switching between the autonomous driving and the manual driving. In the present embodiment, the vehicles A and B will be described as vehicles having the autonomous driving function.

Next, with reference to FIG. 2, a configuration example of the vehicle A, the vehicle B, and the server 400 will be described.

First, a configuration example of the vehicle A will be described.

Figure 2:
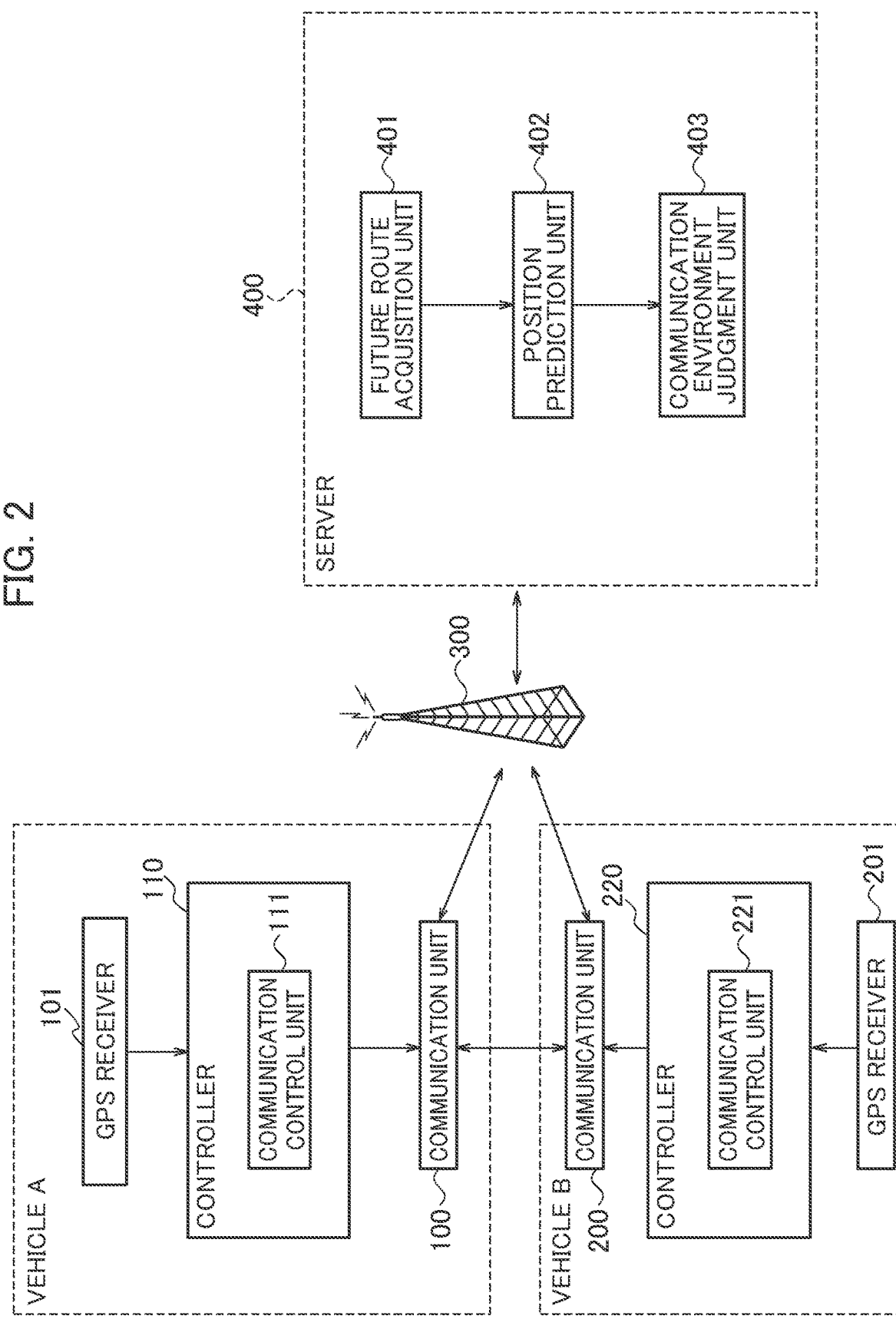
FIG. 2 is a schematic diagram illustrating a vehicle and a server according to the first embodiment of the present invention.

As shown in FIG. 2, the vehicle A includes the communication unit 100, a GPS receiver 101, and a controller 110. The communication unit 100, the GPS receiver 101, and the controller 110 may be collectively referred to as an information processing device.

The GPS receiver 101 receives radio waves from satellites so as to detect the positional information of the vehicle A on the ground. The positional information of the vehicle A detected by the GPS receiver 101 includes latitude information and longitude information. The GPS receiver 101 outputs the detected positional information of the vehicle A to the controller 110. The method for detecting the positional information of the vehicle A is not limited to the GPS receiver 101. For example, the position may be estimated using a method called odometry. The odometry is a method of estimating the position of the vehicle A by estimating an amount of movement and direction of movement of the vehicle A in accordance with a rotation angle and a rotation angle speed of the vehicle A. The GPS (Global Positioning System) is a part of the GNSS (Global Navigation Satellite System).

The controller 110 is a general-purpose microcomputer including a central processing unit (CPU), a memory, and an input-output unit. A computer program is installed on the microcomputer so as to function as the information processing device. The microcomputer functions as a plurality of information processing circuits included in the information processing device when the computer program is executed. While the present embodiment is illustrated with the case in which the software is installed to fabricate the information processing circuits included in the information processing device, dedicated hardware for executing each information processing as described below can be prepared to compose the information processing circuits. The respective information processing circuits may be composed of individual hardware. The controller 110 includes, as examples of the plural information processing circuits, a communication control unit 111.

The communication control unit 111 controls a communication system based on the communication environment. In present embodiment, the communication environment includes at least one of the following characteristics: reception intensity, moving speed, multiple reflection, channel utilization rate, and automatic deletion rate. The moving speed means the vehicle speed of the vehicle A and the vehicle B. The channel utilization rate indicates the utilization rate in communication with other devices such as other vehicles and pedestrian terminals. The automatic deletion rate indicates the rate at which data is thinned out when the predetermined channel utilization rate is exceeded. When the communication environment is not favorable, the communication control unit 111 switches from the direct communication to the indirect communication. The communication control unit 111 uses the communication environment judged by the communication environment judgment unit 403, but is not limited thereto. The communication control unit 111 may have a function of judging the communication environment. The communication control unit 111 may control the communication system using the communication environment judged by itself.

The communication unit 100 broadcasts the vehicle A position data including current positional information of the vehicle A, travel plan information, etc., to the periphery of the vehicle A. The direct communication system is used for the broadcast transmission. The direct communication method is, for example, a DSRC method based on IEEE 802.11 p (Frequency: 5.9 GHz band), or a cellular V2X method based on 3GPP Release 14 or later. The current positional information is data in which the latitude and longitude indicating the position of the vehicle are associated with the time when the position is acquired. The travel plan information is travel plan data including vehicle speed plan data in which the vehicle speed is associated with the future position of the vehicle and future travel route data. The future travel route data may be route information of a traveling road traveling to a predetermined destination, or may be data in which a future position (Latitude, Longitude) and a scheduled passing time are associated based on the vehicle speed plan data. For example, the travel plan information is data obtained by adding the vehicle speed plan data to the data based on the message of SAE 2735 (Dedicated Short Range Communications (DSRC) Message Set Dictionary). An example of the vehicle A position data transmitted by broadcast is shown in Table 1. The vehicle A position data is transmitted as package data including header and content data from the communication unit 100, received by the communication unit 200 of the vehicle B, or acquired via the base station 300 by the future route acquisition unit 401 of the server 400.

As shown in Table 1, in the header of the vehicle A position data, the identification number of the vehicle A as the transmission source and identification information (for example, the current positional information, an ID indicating the travel plan information) indicating the type of the content included in the content data are stored. The content data stores the current positional information and travel plan information, which are data in which the latitude and longitude are associated with the time at which the information is acquired. These header and content data are generated by the controller 110 of the vehicle A based on data acquired from the GPS receiver 101 and various sensors 102 and data previously recorded in a memory provided in the controller 110 to generate vehicle A position data.

TABLE 1

| | |
|---|---|
| header | identification number of transmission vehicle identification information indicating type of content included in content data (for example, current positional information, travel plan information, ID indicating future position are stored) |
| content data | current positional information: latitude, longitude and data associated with time when position information was acquired travel plan information: vehicle speed plan data where vehicle speed is associated with future position of the vehicle and travel plan data including future travel route data |

Next, a configuration example of the vehicle B will be described.

As shown in FIG. 2, the vehicle B includes the communication unit 200, the GPS receiver 201, and the controller 220. The communication unit 200, the GPS receiver 201, and the controller 220 may be collectively referred to as an information processing device.

The function of the GPS receiver 201 is similar to that of the GPS receiver 101. The controller 220, like the controller 110, is a general-purpose microcomputer including a CPU, a memory, and an input/output unit. The controller 220 includes a communication control unit 221 as an example of a plurality of information processing circuits. The function of the communication control unit 221 is the same as that of the communication control unit 111.

The communication unit 200 receives the vehicle A position data transmitted from the communication unit 100 of the vehicle A, and outputs the received vehicle A position data to the data reception unit 222. The data reception unit 222 acquires vehicle A position data from a communication unit 200. The fact that the communication unit 200 has received the vehicle A position data means that the direct communication has been established between the vehicle A and the vehicle B. Therefore, when the communication unit 200 receives the vehicle A position data, the communication control unit 221 transmits the current positional information of the vehicle A, the vehicle A position data including the travel plan information of the vehicle A, a signal indicating that the direct communication with the vehicle A has been established, and the like to the server 400. At this time, the communication control unit 221 transmits the vehicle B position data including the current positional information of the vehicle B and the travel plan information of the vehicle B as well as the package data shown in Table 1 to the server 400.

The server 400, like the controller 110, is a general-purpose microcomputer including a CPU, a memory, and an input/output unit. The server 400 includes, as an example of a plurality of information processing circuits, a future route acquisition unit 401, a position prediction unit 402, and a communication environment judgment unit 403.

The future route acquisition unit 401 acquires current position and travel plan information for each of the vehicles A and B based on the vehicle A position data and the vehicle B position data received via the base station 300. The future route acquiring unit 401 may receive and acquire the data transmitted from the communication unit 200 of the vehicle B, or may receive the position data of the vehicle A transmitted from the communication unit 100 of the vehicle A (Current positional information and travel plan information of vehicle A), and receive the position data of the vehicle B transmitted from the communication unit 200 of the vehicle B (Current positional information and travel plan information of vehicle B). Further, the server 400 may read the travel plan information received in the past and stored in the memory, or may request and receive the travel plan information from each of the vehicles A and B. The future route acquisition unit 401 outputs the acquired travel plan information to the position prediction unit 402.

A position prediction unit 402 predicts the future positions of the vehicles A and B in the future based on the positional information of the vehicles A and B acquired from the vehicle B and the travel plan information acquired from the future route acquisition unit 401. For example, the position prediction unit 402 predicts the relative position and the relative distance of the vehicle B with respect to the future vehicle A based on the predicted future positions of the vehicles A and B. The position prediction unit 402 outputs the predicted positional relationship to the communication environment judgment unit 403.

The communication environment judgment unit 403 judges a future communication environment between the vehicles A and B based on the positional relationship between the vehicles A and B predicted by the position prediction unit 402. The communication environment judgment unit 403 estimates the amount of data that can be transmitted through the direct communication. To estimate the amount of data, a channel utilization rate indicating a state in which other vehicles, pedestrians, and the like are communicating and a data automatic deletion rate indicating a ratio of thinning data when the predetermined channel utilization rate is exceeded are used. These channel utilization rates and the data automatic deletion rates are applied to SAEJ 2945/1, for example.

(Communication Environment Judgment Method)

Figure 3:
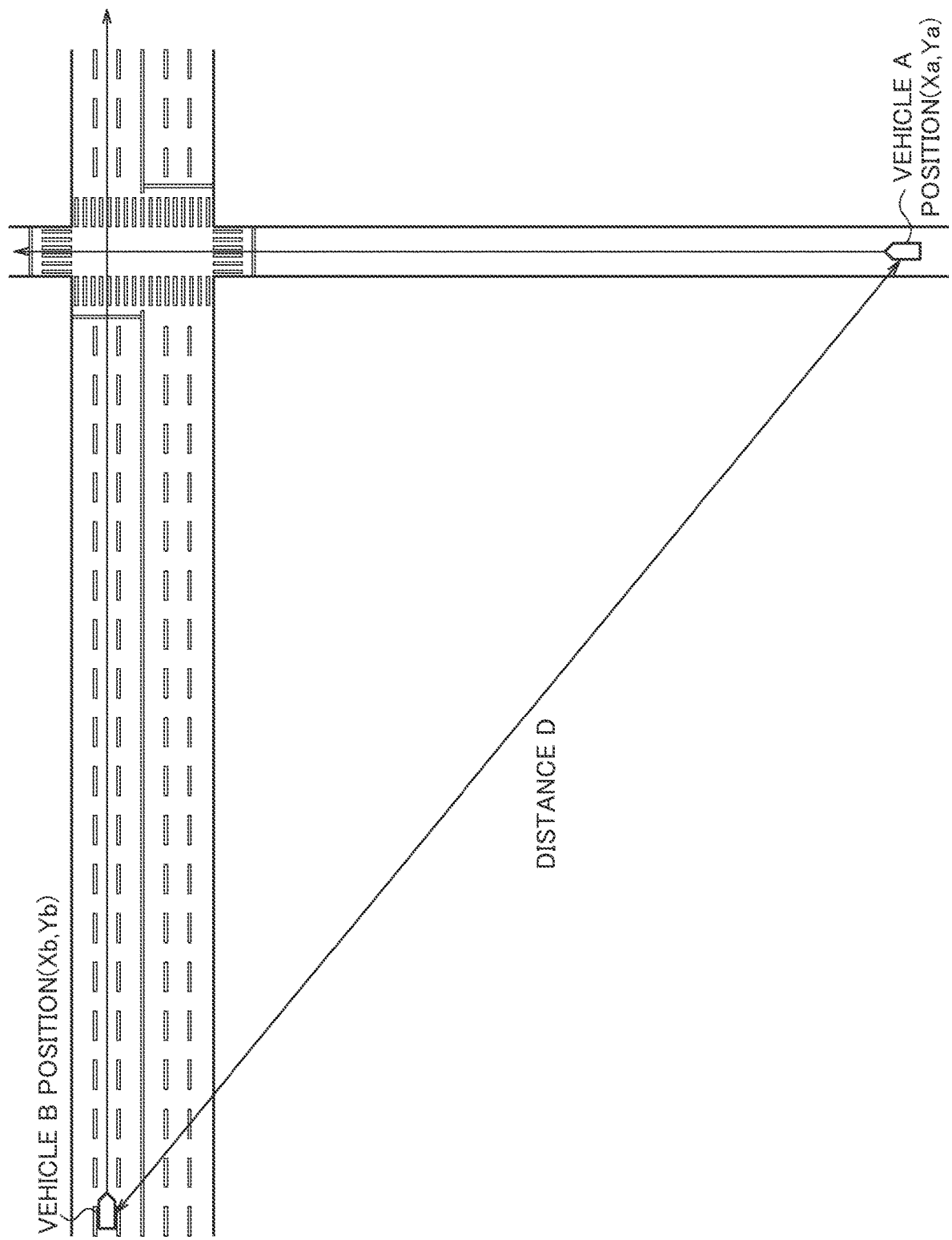
FIG. 3 is a diagram for explaining an example of a traveling scene according to the first embodiment of the present invention.

Next, with referring to FIG. 3, an example of the communication environment judgment judged by the communication environment judgment unit 403 will be described.

A communication environment judgment unit 403 estimates the radio wave intensity based on the positional relation between the vehicles A and B. The radio wave intensity is an index indicating the intensity of the radio wave. The radio wave intensity may be expressed as the reception intensity. An example of the positional relationship between the vehicle A and the vehicle B will be described with reference to FIG. 3. In the scene shown in FIG. 3, the vehicle A is proceeding straight along one-lane road. The vehicle B is proceeding straight on the center lane of three-lane road with one side. The road on which the vehicle A is traveling and the road on which the vehicle B is traveling intersect. The vehicle A and vehicle B are traveling at 500 m before the intersection at 40 km/h. When the position coordinate of the vehicle A is (Xa, Ya) and the position coordinate of the vehicle B is (Xb, Yb), the distance D (hereinafter simply referred to as distance D) on the straight line between the vehicle A and the vehicle B is expressed by Formula 1. The initial positions are the position coordinates (Xa, Ya) and (Xb, Yb).

[Math. 1]

$$D=\{(Yb-Ya)^2+(Xb-Xa)^2\}^{1/2} \quad (1)$$

The route along which the vehicle A and the vehicle B will travel in the future is acquired by the future route acquisition unit 401. In the scene shown in FIG. 3, the route along which the vehicles A and B will travel in the future is a straight route. The position prediction unit 402 predicts the positional relation between the vehicles A and B in the future based on the route acquired by the future route acquisition unit 401. Since the vehicles A and B are traveling at 40 km/h, the distance D gradually decreases as the vehicles A and B approach the intersection. The distance D has a maximum value at the initial position and a minimum value near the intersection. The radio wave intensity changes according to the distance D, that is, according to the positional relationship between the vehicles A and B. Therefore, the communication environment judgment unit 403 evaluates attenuation of the radio wave intensity for each distance from the maximum value to the minimum value of the distance D. Attenuation of the radio wave intensity for each distance may hereinafter be referred to as distance attenuation. The minimum value of the distance D may be set to zero. Formula 2 is used to evaluate the attenuation of the radio wave intensity.

[Math. 2]

$$Pr=Pt+Gr+20\log(\lambda/\pi)-20\log(d) \quad (2)$$

Herein, Pt [dBm] is the actual radiation power of the transmitter, and is generally judged by an antenna power upper limit value in accordance with laws and regulations. Gr [dB] is the gain of the receiver. λ[m] is the wavelength of the carrier frequency. π is the ratio of the circumference of a circle to its diameter.

In general, since the height of the road surface and the antenna of the vehicle are different, the road surface reflected wave and the direct communication wave overlap each other. For this reason, it is known that the received power varies greatly according to the distance from the road surface to the antenna. The communication environment judgment unit 403 evaluates this phenomenon by using Formulas 3 and 4.

[Math. 3]

$$Pr = Pt + Gr + 20\log\left(\frac{\lambda}{2\pi d}\sin\left(\frac{\Delta\phi}{2}\right)\right) \quad (3)$$

[Math. 4]

$$\Delta\phi = \frac{4\pi h_r h_f}{\lambda d} \quad (4)$$

Where ht is the height of the antenna of the vehicle A. If ht is included in the positional information of vehicle A, that value is used. If ht is not included in the positional information of the vehicle A and the vehicle A is a large vehicle, for example, ht is set to 3.5 m based on the height of the vehicle A. Otherwise based on the general height of the sedan type, for example ht is set to 1.55 m. The large-sized vehicle is, for example, a truck or a bus. Whether or not the vehicle A is a large vehicle may be included in the data transmitted from the vehicle A to the vehicle B.

Where hr is the height of the antenna of vehicle B. Since the setting of hr is the same as that of ht, the description is omitted. Further, since the evaluation method using the above-described Formulas 2 to 4 is generally known, description thereof is omitted.

After estimating the radio wave strength, the communication environment judgment unit 403 evaluates the minimum reception sensitivity Pr_min [dBm] corresponding to the transmission/reception data rate of the communication unit 200, and evaluates the range over which communication is possible at the transmission/reception data rate. Specifically, the communication environment judgment unit 403 evaluates the reception strength of the communication unit 200 for each distance. When the ITS frequency (5.9 GHz band) or is used, the analysis interval of the distance D is set to 1 m based on the inflection point caused by the fluctuation factor of the center frequency of the radio and the received electric field strength (Two-Wave model of ground reflection). In other words, "every distance" means, for example, every meter.

When the reception intensity is higher than 10 times the minimum reception power at all points (Hereinafter, the entire section may be referred to as the entire section.) of the route, the communication environment judgment unit 403 judges that the direct communication is possible in all sections. Minimum received power means the minimum received power that ensures the required reception quality for communications. Alternatively, when the reception intensity is higher than 10 times the average reception power in all the sections, the communication environment judgment unit 403 may judge that the direct communication is possible in all the sections. If the reception intensity is equal to or lower than the reception sensitivity at some points (Hereinafter, some sections may be referred to as sections.)

of the route, the communication environment judgment unit 403 judges that the direct communication is difficult in some sections. If the reception intensity is equal to or lower than the reception sensitivity in some sections, the corresponding sections are recorded.

As described above, as a result of evaluating the reception strength for each distance, the communication environment judgment unit 403 judges that the direct communication is possible in all the sections when the reception strength exceeds the threshold value in all the sections. If there is a section in which the reception intensity is equal to or lower than the threshold value, the communication environment judgment unit 403 judges that the direct communication is difficult in that section. Thus, assuming that the initial connection of the direct communication is accidentally realized or that the attenuation is suddenly generated due to the influence of the road surface reflection or the like, the communication environment judgment unit 403 can judge whether the other party has stopped communication or whether the communication is only temporarily stopped. The threshold value may be defined as the reception sensitivity.

Figure 4:
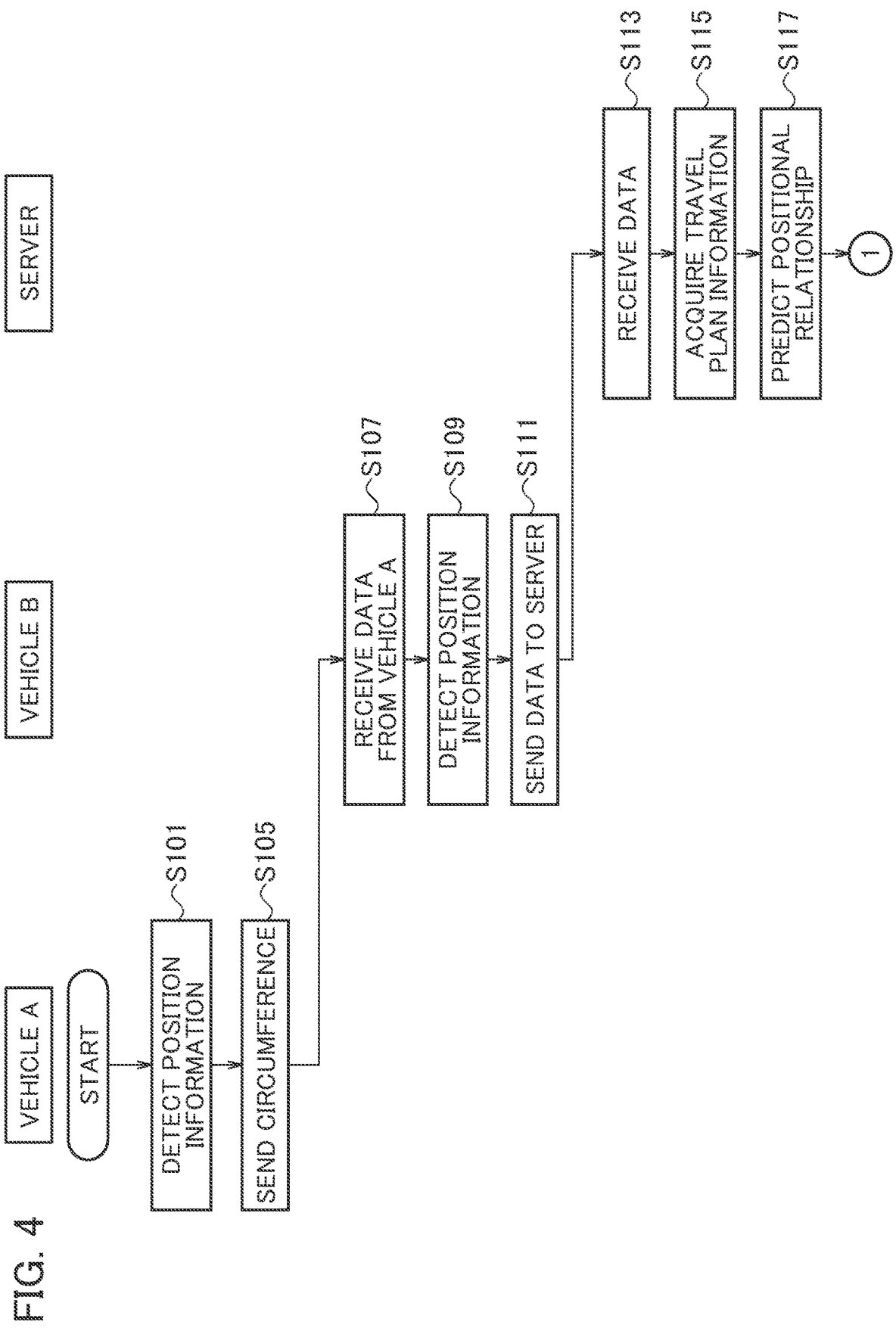
FIG. 4 is a flowchart illustrating an exemplary operation of the vehicle and the server according to the first embodiment of the present invention.
Figure 5:
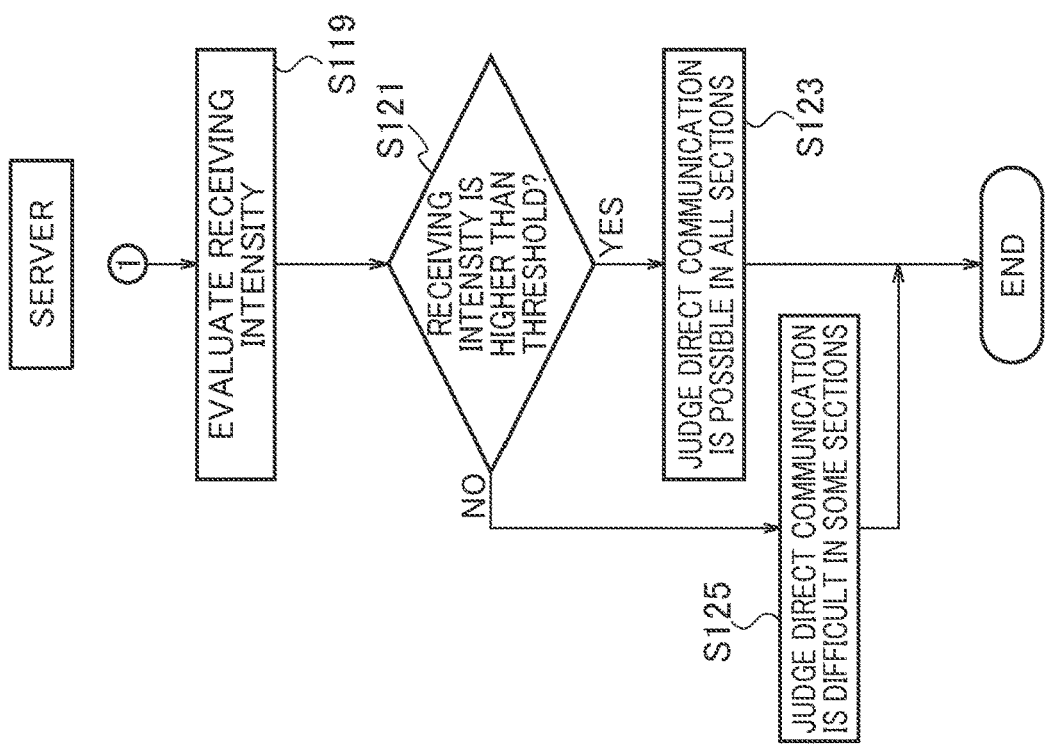
FIG. 5 is a flowchart illustrating an exemplary operation of the vehicle and the server according to the first embodiment of the present invention.

Next, with reference to a flowchart shown in FIGS. 4 to 5, an operation example of the vehicle A, the vehicle B, and the server 400 will be described.

In step S101, the vehicle A detects the positional information of the vehicle A using the GPS receiver 101. The process proceeds to step S105, and the vehicle A broadcasts the positional information detected in step S101 to the surroundings of the vehicle A.

The process proceeds to step S107, where the vehicle B receives data from the vehicle A. In step S109, the vehicle B detects the positional information of the vehicle B using the GPS receiver 201. In step S111, the vehicle B transmits the positional information of the vehicle A, the positional information of the vehicle B, the signal indicating that the direct communication with the vehicle A has been established, and the like to the server 400.

The process proceeds to step S113, where the server 400 receives data from the vehicle B. In step S115, the server 400 acquires travel plan information of the vehicles A and B. In step S117, the server 400 predicts the positional relationship between the vehicles A and B in the future based on the travel plan information acquired in step S115. The process proceeds to step S119, where the server 400 evaluates the reception strength for each distance.

In step S121, if the reception strength exceeds the threshold value in all the sections (Yes in step S121), the server 400 judges that the direct communication is possible in all the sections (Step S123). On the other hand, if there is the section where the reception intensity is equal to or smaller than the threshold value (No in step S121), the server 400 judges that the direct communication is difficult in that section.

[Operational Advantage]

According to the first embodiment, a first future position where the vehicle A travels in the future is acquired, a second future position where the vehicle B travels in the future is acquired, the current communication environment with the vehicle B is judged based on a signal received from the vehicle B, the current communication environment is corrected based on the acquired first future position and the second future position, and the future communication environment with the vehicle B is judged based on the corrected current communication environment. According to the first embodiment, when the direct communication is first established between the vehicle A and the vehicle B, it is judged whether or not the direct communication can be maintained on the basis of a future traveling route. If the direct communication can be maintained in the future, it will be possible, for example, to formulate a plan for automatic driving support, because location information, etc. will be shared through the direct communication. Further, since the possibility that the necessary information does not arrive can be detected in advance, it is possible to prepare connection to another communication means (for example the indirect communication via cellular phone network 310). Thus, necessary information can be exchanged at a necessary timing. Further, the initial connection time generated when the direct communication as in the prior art is switched to the indirect communication after being disconnected can be eliminated. Further, since it is not necessary to maintain the connection of the indirect communication via the cellular phone network 310 which is unnecessary when the direct communication is stabilized, the data communication amount via the cellular phone network and the calculation processing load of the on-vehicle device (controller 110) can be reduced.

In the first embodiment, the first future route where the vehicle A travels in the future and the second future route where the vehicle B travels in the future may be acquired, the future first future position of the vehicle A in the acquired first future route may be predicted, the future second future position of the vehicle B in the acquired second future route may be predicted, and the current communication environment may be corrected based on the predicted first future position and the predicted second future position.

Second Embodiment

Figure 6:
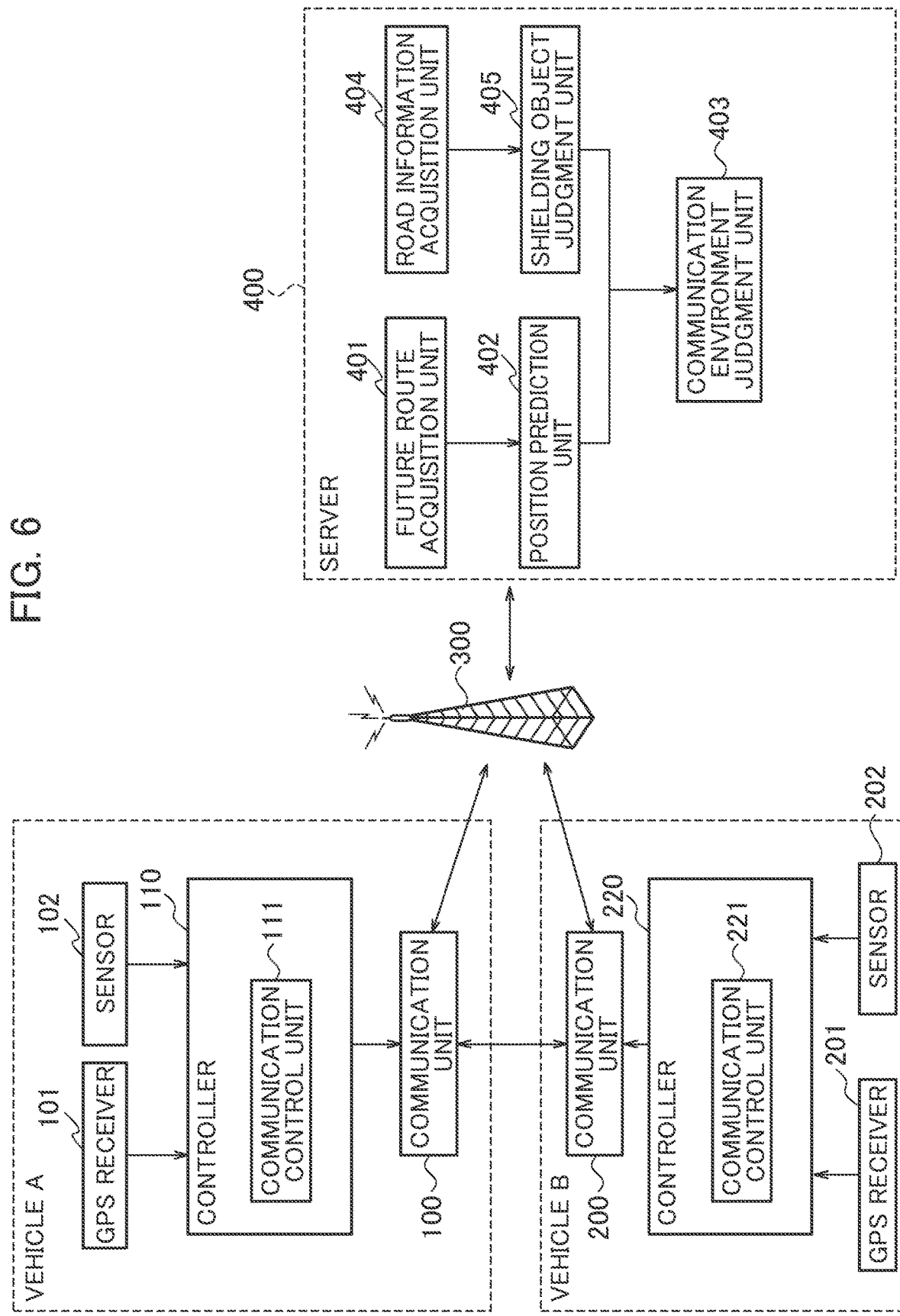
FIG. 6 is a schematic diagram illustrating a vehicle and a server according to a second embodiment of the present invention.

Next, the second embodiment of the present invention will be described with reference to FIG. 6. In the second embodiment, the vehicle A includes a sensor 102. The vehicle B includes a sensor 202. The server includes a road information acquisition unit 404 and a shielding object judgment unit 405. The same elements as in the first embodiment are indicated by the same reference numerals, and overlapping explanations are not repeated below. The main differences are as follows.

The sensor 102 is mounted on the vehicle A and detects information of the vehicle A and an object around the vehicle A. For example, the sensor 102 detects an object on or around a road. The sensor 102 comprises a plurality of sensors. For example, the sensor 102 includes a wheel speed sensor, a steering angle sensor, a gyro sensor, and the like. These sensors detect the speed and steering angle of the vehicle A. The sensor 102 includes a camera, a LiDAR (light detection and ranging), a radar, a millimeter wave radar, a laser range finder, a sonar, etc. These sensors detect a moving object including another vehicle (include the vehicle B), a motorcycle, a bicycle, and a pedestrian, as well as an obstacle, a falling object, a stationary object including a parked vehicle, a road shape, a road structure, and a building around the road as objects around the vehicle A. As specific detection data, when another vehicle exists around the vehicle A, the identification number, position, speed, type (car type), height, traveling direction, past traveling trajectory, future trajectory based on the past traveling trajectory, and the like of the other vehicle are detected. Further, three-dimensional data may be generated in which the shape around the vehicle detected by the sensor is expressed by a set of three-dimensional points. The object data about the objects around the vehicle A detected by the sensor 102 is transmitted through the communication unit 100 to the communication unit 200 of the vehicle B and the base station 300 to the future route acquisition unit of the server 400. An example of object data is shown in Table 2. As shown in Table 2, the header of the object data stores, for example, the identification number of the vehicle that detected the object, sensor information used by the vehicle to detect the object, and identification information indicating the content type included in the content data. The sensor information includes, for example, identification information of the sensor (manufacturer's name, model name, and sensor type), how the sensor is mounted on the vehicle (relative orientation to the vehicle, sensor specification (resolution, resolving power, viewing angle, etc.), and recognition state of the sensor (measurement accuracy). The identification information indicating the content type included in the content pack includes, for example, data for identifying the detected object (for example, pedestrians, parked vehicles, obstacles, etc.).

TABLE 2

| header | identification number of vehicle that detected object sensor information used by vehicle to detect object : sensor information (manufacturer's name, model name, and sensor type) , how sensor is mounted on vehicle (relative orientation to vehicle, sensor specification (resolution, resolving power, viewing angle, etc.), and recognition state of the sensor (measurement accuracy)) identification information indicating type of content included in content data: for example, data for identifying detected object (for example, pedestrians, parked vehicles, obstacles, etc.) |
|---|---|
| content data | data of detected object 1: type of object 1 (standard vehicle, truck, pedestrian, parked vehicle, obstacle, building around road, road structure (guardrail etc.), etc), position of object 1, speed and direction of movement, height of object 1, driving environment of vehicle A when object 1 is detected (latitude, longitude, driving direction, vehicle speed, steering angle) and data relating to time when object 1 was detected data of detected object 2: type of object 2, position of object 2, speed and direction of movement, height of object 2, driving environment of vehicle A when object 2 is detected (latitude, longitude, driving direction, vehicle speed, steering angle) and data relating to time when object 1 was detected road shape around vehicle A: road width, lane width, number of lanes, presence of sidewalks, road shape (intersection, straight, roundabout, etc.), road alignment (curvature, slope) |

The object data of the vehicle A received by the communication unit 200 and detected by the sensor 102 is stored in the storage device (not shown) of the vehicle B.

The sensor 202 is mounted on the vehicle B and detects information of the vehicle B and objects around the vehicle B. Since the function of the sensor 202 is the same as that of the sensor 102, description thereof is omitted. The controller 220 generates, based on the data detected by the sensor 202, the object data of the vehicle B as the package data shown in Table 2, transmits it through the communication unit 200 to the server 400, and the future route acquisition unit of the server 400 acquires it. Similarly, the controller 220 of the vehicle B may transmit the object data of the vehicle B to the vehicle A via the communication unit 200, and the communication unit 100 of the vehicle A receives the object data. The object data of the vehicle A, which is stored in the storage device of the vehicle B and detected by the sensor 102, is also transmitted through the communication unit 200 to the server 400.

The road information acquisition unit 404 acquires map information (including road structure, number of lanes on the road, structures on the road, etc.), congestion information, availability of nearby parking lots, accident information, construction information, signal information, and the like. The road information acquisition unit 404 may acquire such information from the vehicle B or from a cloud on the Internet. The vehicle B can obtain this information by V2I (VEHICLE TO INFRASTRUCTURE) and provide it to server 400. V2I is a technology to exchange information between vehicles and communication facilities installed on roads, and is sometimes called roadside-to-vehicle communication. The information detected by the vehicle A may include this information. The road information acquisition unit 404 outputs the acquired information to the shielding object judgment unit 405.

The shielding object judgment unit 405 acquires map information or the like from the road information acquisition unit 404. The shielding object judgment unit 405 acquires the positional relationship between the vehicles A and B in the future from the position prediction unit 402. The shielding object judgment unit 405 acquires data detected by the sensor 102 and the sensor 202. The shielding object judgment unit 405 calculates a straight route for a possible combination of the positions of the vehicles A and B in the future. The possible combinations of the positions of vehicles A and B in the future refer to the combinations of the positions of vehicles A and B at different distances (For example, 1 m) when the vehicles A and B are driven according to a travel route. That is, the shielding object judgment unit 405 calculates a straight route for each distance from the maximum value to the minimum value of the distance D. The straight route is a route connecting the vehicle A and the vehicle B in a straight line. Therefore, in present embodiment, the straight route may overlap an area other than the road. The shielding object judgment unit 405 judges whether or not there is a building on the calculated straight route.

The shielding object judgment unit 405 calculates a following route between the vehicle A and the vehicle B. The following route between the vehicle A and the vehicle B is a route connecting the road route from the vehicle A to the vehicle B along the traveling route of the vehicle A and the vehicle B. The shielding object judgment unit 405 judges whether or not a large vehicle exists on the following route. The shielding object judgment unit 405 outputs the judgment result to the communication environment judgment unit 403.

The communication environment judgment unit 403 corrects the current communication environment based on the information acquired from the shielding object judgment unit 405. Specifically, the communication environment judgment unit 403 corrects the current radio wave intensity based on the presence of the building and the large vehicle to correct the current communication environment. Then, the communication environment judgment unit 403 judges the future communication environment based on the corrected current communication environment.

(Communication Environment Correction Method)

Figure 7:
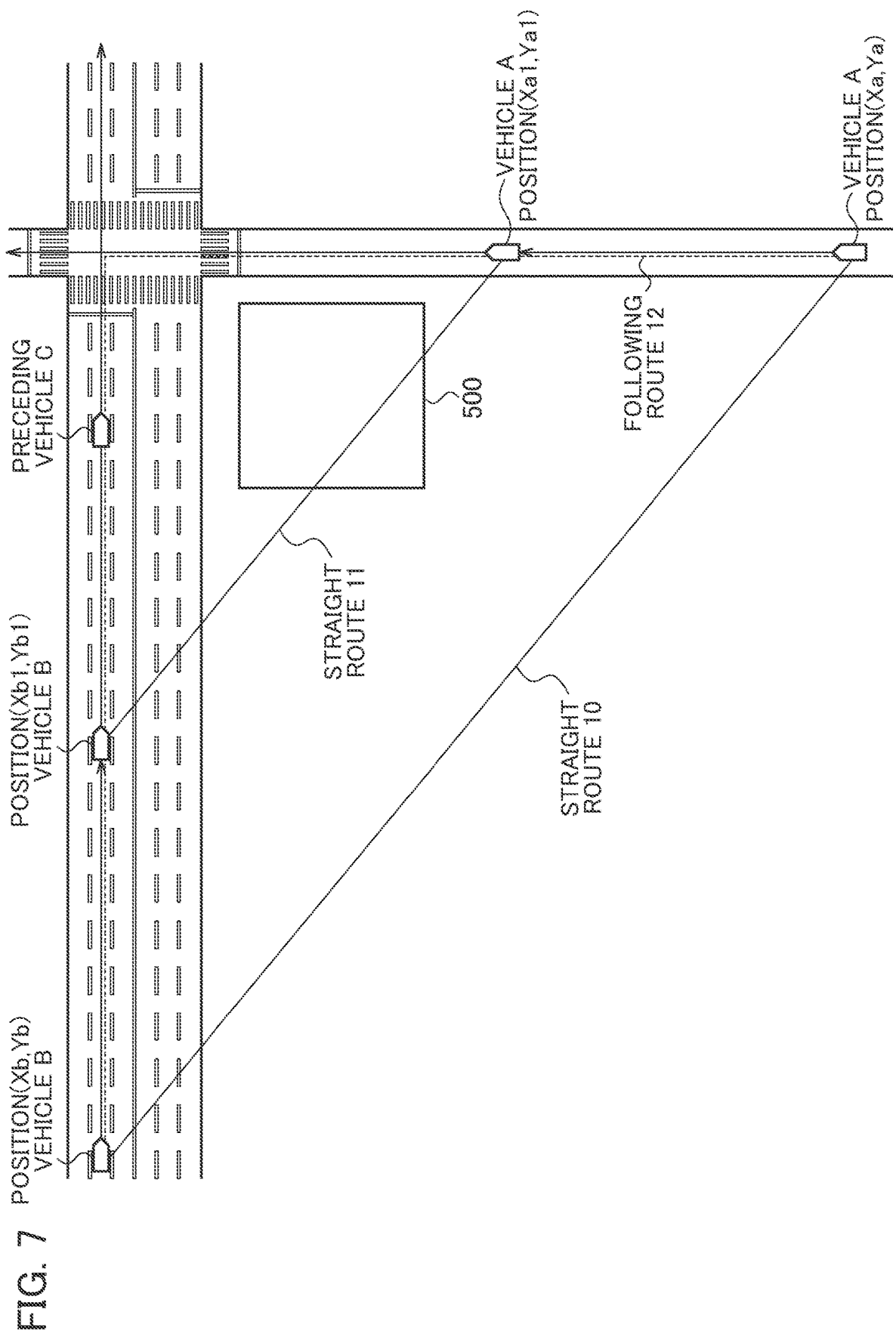
FIG. 7 is a diagram for explaining an example of a traveling scene according to the second embodiment of the present invention.

Next, with reference to FIG. 7, an example of a method of correcting the current communication environment will be described. In a scene shown in FIG. 7, the speed and the like of the vehicle A are the same as FIG. 3. FIG. 7 differs from FIG. 3 in that the building 500 exists and the preceding vehicle C exists in front of the vehicle B.

As shown in FIG. 7, when the position of the vehicle A is the initial position (Xa, Ya) and the position of the vehicle B is the initial position (Xb, Yb), the shielding object judgment unit 405 calculates a straight route 10 connecting the vehicle A and the vehicle B in a straight line. Since vehicles A and B are traveling at 40 km/h, vehicles A and B gradually approach the intersection. For each predetermined distance (For example, 1 m) when the vehicle A and the vehicle B travel along the travel route, the shielding object judgment unit 405 calculates the straight route. In FIG. 7, as an example, a straight route 11 is shown when the vehicle A is at the position (Xa1, Ya1) and the vehicle B is at the position (Xb1, Yb1). On the straight route 10, there is no building 500, but on the straight route 11, there is the building 500. The presence of the building 500 on the straight route 11 is judged by the shielding object judgment unit 405. The location of the building 500 can be obtained by referring to the map information. In this way, the shielding object judgment unit 405 judges whether or not the building 500 is present on the future straight route based on the map information and the positional relationship between the vehicles A and B. Incidentally, the building 500 is a building existing outside the route of the vehicles A and B (out of the road).

As shown in FIG. 7, the preceding vehicle C exists in front of the vehicle B. The preceding vehicle C is described as a large vehicle larger than the vehicle A and the vehicle B. The vehicle A and the vehicle B are ordinary vehicles. Whether or not the preceding vehicle C is a large vehicle can be judged from the detection result of the sensor 102 or the sensor 202. For example, when it is found from the detection result of the sensor 102 or the sensor 202 that the height of the preceding vehicle C is higher than the heights of the vehicles A and B, the preceding vehicle C is judged to be a large vehicle. As shown in FIG. 7, the preceding vehicle C exists on the following route 12. The presence of the preceding vehicle C on the following route 12 is judged by the shielding object judgment unit 405. More specifically, the shielding object judgment unit 405 judges, based on the data acquired from the sensor 102 or the sensor 202, that the preceding vehicle C exists on the following route 12. The reason for detecting the building 500 and the preceding vehicle C is that the building 500 and the preceding vehicle C may block radio waves used for the direct communication. The shielding object judgment unit 405 outputs the presence of the building 500 and the presence of the preceding vehicle C to the communication environment judgment unit 403.

The communication environment judgment unit 403 corrects the current communication environment based on the information acquired from the shielding object judgment unit 405. The current communication environment means, in the scene shown in FIG. 7, the communication environment when the vehicle A and the vehicle B are in the initial position. When it is judged that the building 500 exists on a straight line route 11 connecting the future position of the vehicle A (Xa1, Ya1) and the future position of the vehicle B (Xb1, Yb1) in a straight line, the communication environment judgment unit 403 selects the following route 12 as the route of the direct communication and multiplies the distance attenuation by the shielding attenuation factor. In the present embodiment, the direct communication is assumed to be performed along the straight route, the following route, or both routes. For example, when vehicles A and B are in their initial positions, the direct communication may take place along the straight route.

As a specific example of multiplying the distance attenuation by the shielding attenuation factor, the communication environment judgment unit 403 multiplies the estimated radio wave intensity by 30 dB ($10^{-3}$). This value (30 dB) is an example for predicting the availability of the direct communication, and is not particularly limited. For the values for predicting the availability of the direct communication, refer to the following references. Recommendation ITU-R P. 1411-6 (February 2012) (https://www.itu.int/dms_pubrec/itu-r/rec/p/R-REC-P.1411-6-201202-S!!PDF-E.pdf)

As described in the first embodiment, the estimated radio wave intensity is the radio wave intensity estimated by the communication environment judgment unit 403.

In the scene shown in FIG. 7, since the large vehicle (preceding vehicle C) is detected in the following route 12, the communication environment judgment unit 403 multiplies the estimated radio wave intensity by 12.5 dB (approximately $10^{-1}$). This value (12.5 dB) is also an example for predicting the availability of the direct communication and is not particularly limited. For the values for predicting the availability of the direct communication, refer to the following references. 3GPP TR 37.885 "Study on evaluation methodology of new Vehicle-to-Everything V2X use case for LTE and NW", 2018

In the present embodiment, the presence of the large vehicle on the following route 12 means that the large vehicle is present on the route on which the vehicle A or the vehicle B will travel in the future.

The shielding attenuation factor is 30 dB and 12.5 dB as described above. Correcting the current communication environment means multiplying the estimated radio wave intensity by the shielding attenuation factor. The estimated radio wave intensity after multiplying the shielding attenuation factor is hereinafter referred to as the corrected estimated radio wave intensity. The communication environment judgment unit 403 evaluates the estimated radio wave intensity after correction for each distance. The communication environment judgment unit 403 judges that the direct communication is possible in all sections when the estimated radio wave intensity after correction exceeds a threshold in all sections. If there is a section in which the estimated radio wave intensity after correction is equal to or less than the threshold value, the communication environment judgment unit 403 judges that the direct communication is difficult in the section. The threshold value is the same as the threshold value used in the first embodiment.

When the preceding vehicle C is detected on the following route 12, the multiplied value of 12.5 dB is multiplied by the multiplied value of 30 dB. If the preceding vehicle C is not detected on the following route 12, the future communication environment is judged based on the value multiplied by only 30 dB. If the building 500 does not exist on the straight route 11 and the preceding vehicle C is detected on the following route 12, the future communication environment is judged based on the value multiplied by only 12.5 dB.

In this way, the communication environment judgment unit 403 corrects the current communication environment and judges the future communication environment based on the corrected current communication environment. Thus, it is possible to prepare in advance for the case where the communication environment deteriorates.

Figure 8:
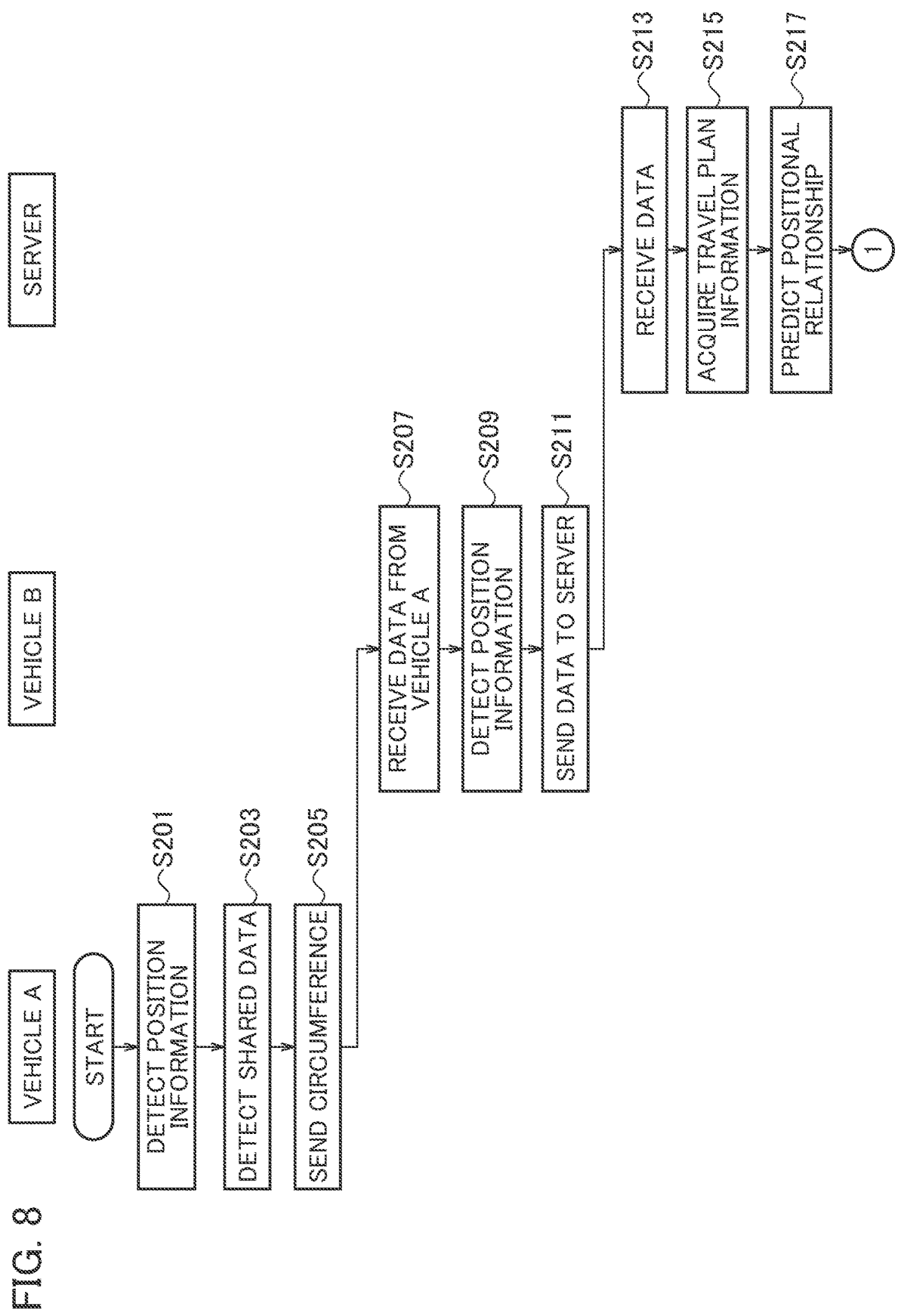
FIG. 8 is a flowchart illustrating an exemplary operation of the vehicle and the server according to the second embodiment of the present invention.
Figure 9:
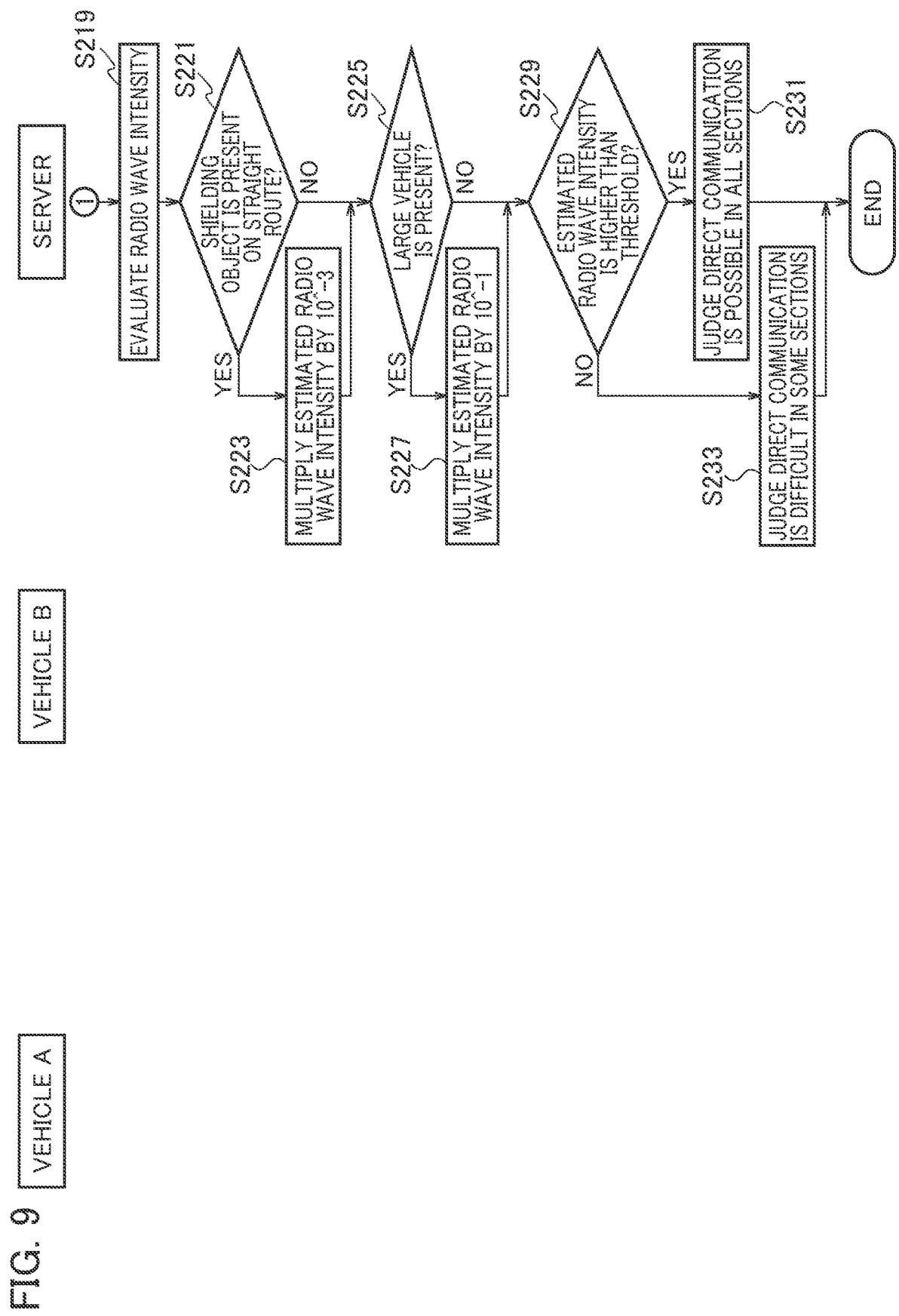
FIG. 9 is a flowchart illustrating an exemplary operation of the vehicle and the server according to the second embodiment of the present invention.

Next, with reference to a flowchart shown in FIGS. 8 to 9, an operation example of the vehicle A, the vehicle B, and the server 400 will be described. The process in steps S201, S205 to S219 is the same as the process in steps S101, S105 to S119 shown in FIGS. 4 to 5, and overlapping explanations are not repeated below.

In step S203, the vehicle A detects data shared with the vehicle B. The data shared with the vehicle B are positional information, speed information, and information about the traveling direction of the vehicle A. The positional information of the vehicle A is detected in step S201. The data shared with the vehicle B includes the identification number, position, speed, type (car type), height, traveling direction, past travel trajectory, future trajectory based on past travel trajectory, and the like of other vehicles.

In step S221, the server 400 calculates a straight route for each distance between the maximum value and the minimum value of the distance D. Next, the server 400 judges whether or not a building (shield object) exists on the straight route. If the building is on a straight route (Yes in step S221), the process proceeds to step S223, where the server 400 selects following route as the route of the direct communication and multiplies the estimated radio wave intensity by 30 dB. If there is no building on the straight route (No in step S221), and after step S223, the process proceeds to step S225. In step S225, the server 400 judges whether or not there is a large vehicle on the following route.

If there is a large vehicle on the following route (Yes in step S225), the process proceeds to step S227 where the server 400 multiplies the estimated radio intensity by 12.5 dB. If there is no large vehicle on the following route (No in step S225), and after step S227, the process proceeds to step S229. In step S229, if the estimated radio wave intensity exceeds the threshold value in all the sections (Yes in step S229), the server 400 judges that the direct communication is possible in all the sections (Step S231). On the other hand, if there is a section where the estimated radio wave intensity is equal to or less than the threshold value (No in step S229), the server 400 judges that the direct communication is difficult in that section.

[Operational Advantage]

According to the second embodiment, the server 400 acquires a route (first and second future routes) along which the vehicles A and B will travel in the future from the vehicle A or the vehicle B. Note that the server 400 may acquire the route along which the vehicle A will travel in the future from the vehicle A and the route along which the vehicle B will travel in the future from the vehicle B. The server 400 judges the current communication environment between the vehicle A and the vehicle B based on the signal received from the vehicle B. The server 400 also predicts future positions (first and second future positions) of the vehicles A and B on a route along which the vehicles A and B will travel in the future. As shown in FIG. 7, if the traveling routes, traveling directions, and speeds of the vehicles A and B are known, the future positions of the vehicles A and B at each predetermined distance are predicted. The server 400 corrects the current communication environment based on the predicted future positions of the vehicles A and B. Then, the server 400 judges the future communication environment between the vehicle A and the vehicle B based on the corrected current communication environment. The server 400 may also notify the vehicle A and the vehicle B of the judged future communication environment. Thus, the vehicle A and the vehicle B can prepare in advance for the case where the communication environment deteriorates. For example, vehicles A and B may be connected to the indirect communication in advance before disconnecting the direct communication. As a result, the time required for initial connection when switching from the direct communication to the indirect communication is reduced, and smooth data sharing is realized.

The server 400 may also correct the current communication environment based on the relative distance between the vehicles A and B in the future as judged by the future positions of the vehicles A and B. Thus, the vehicle A and the vehicle B can prepare for the case where the communication environment deteriorates in advance based on the change of the distance to the other party.

The server 400 judges the future communication environment between the vehicle A and the vehicle B for each of a straight route connecting the future positions of the vehicle A and the vehicle B in a straight line and the following route connecting the road from the vehicle A to the vehicle B along the traveling route of the vehicle A and the vehicle B. For example, if it is judged that a building exists on a straight route, the server 400 multiplies the estimated radio wave intensity by 30 dB (10^-3) to correct the current communication environment. Then, the server 400 judges the future communication environment between the vehicle A and the vehicle B based on the corrected current communication environment. If it is judged that there is the large vehicle on the following route, the server 400 multiplies the estimated radio wave intensity by 12.5 dB to correct the current communication environment. Then, the server 400 judges the future communication environment between the vehicle A and the vehicle B based on the corrected current communication environment. In this way, the effect of an object capable of blocking the radio wave is evaluated for two kinds of routes of the straight route and the following route. Thus, the vehicle A and the vehicle B can prepare in advance for the case where the communication environment deteriorates.

The server 400 acquires map information including a route along which the vehicles A and B travel in the future. Then, the server 400 judges a future communication environment between the vehicle A and the vehicle B based on map information corresponding to at least one of a route where the vehicle A travels in the future, a route where the vehicle B travels in the future, a future position of the vehicle A, and a future position of the vehicle B. The server 400 can acquire at least one of a route where the vehicle A travels in the future, a route where the vehicle B travels in the future, a future position of the vehicle A, and a future position of the vehicle B. By matching the acquired information with the map information, the server 400 can judge whether or not there is a building capable of blocking radio waves on the route along which the vehicles A and B travel in the future (see FIG. 7). Thus, the server 400 evaluates the influence of a building capable of blocking radio waves on the route along which the vehicles A and B travel in the future, and corrects the current communication environment. Then, the server 400 judges the future communication environment between the vehicle A and the vehicle B based on the corrected current communication environment. Thus, the vehicle A and the vehicle B can prepare in advance for the case where the communication environment deteriorates.

The server 400 acquires data detected by the sensor 102 or the sensor 202. The data detected by the sensor 102 or the sensor 202 includes data of a large vehicle on a following route. The server 400 evaluates the influence of the large vehicle capable of blocking radio waves on the following route where the vehicles A and B travel in the future. While the building is a static object, the large vehicle is a dynamic object. That is, the server 400 can evaluate the impact of each of the static and dynamic objects. Thus, the server 400 can accurately judge the future communication environment between the vehicle A and the vehicle B.

The server 400 may also acquire the amount of data that the vehicle A will transmit to the vehicle B in the future or the amount of data that the vehicle A will receive from the vehicle B. The server 400 may judge whether the acquired amount of data can be transmitted or received in the judged future communication environment. If it is judged that the acquired data amount cannot be transmitted or received in the judged future communication environment, the vehicle A and the vehicle B can prepare for the case where the communication environment deteriorates in advance. For example, vehicles A and B may be connected to the indirect communication in advance before disconnecting the direct communication.

First Modification of the Second Embodiment

In the above example, the building 500 and the preceding vehicle C (heavy vehicle) have been described as objects capable of blocking radio waves used for the direct communication, but the present invention is not limited thereto. For example, an object capable of blocking radio waves includes a mountainous area. The mountainous area will be described with reference to FIG. 10.

Figure 10:
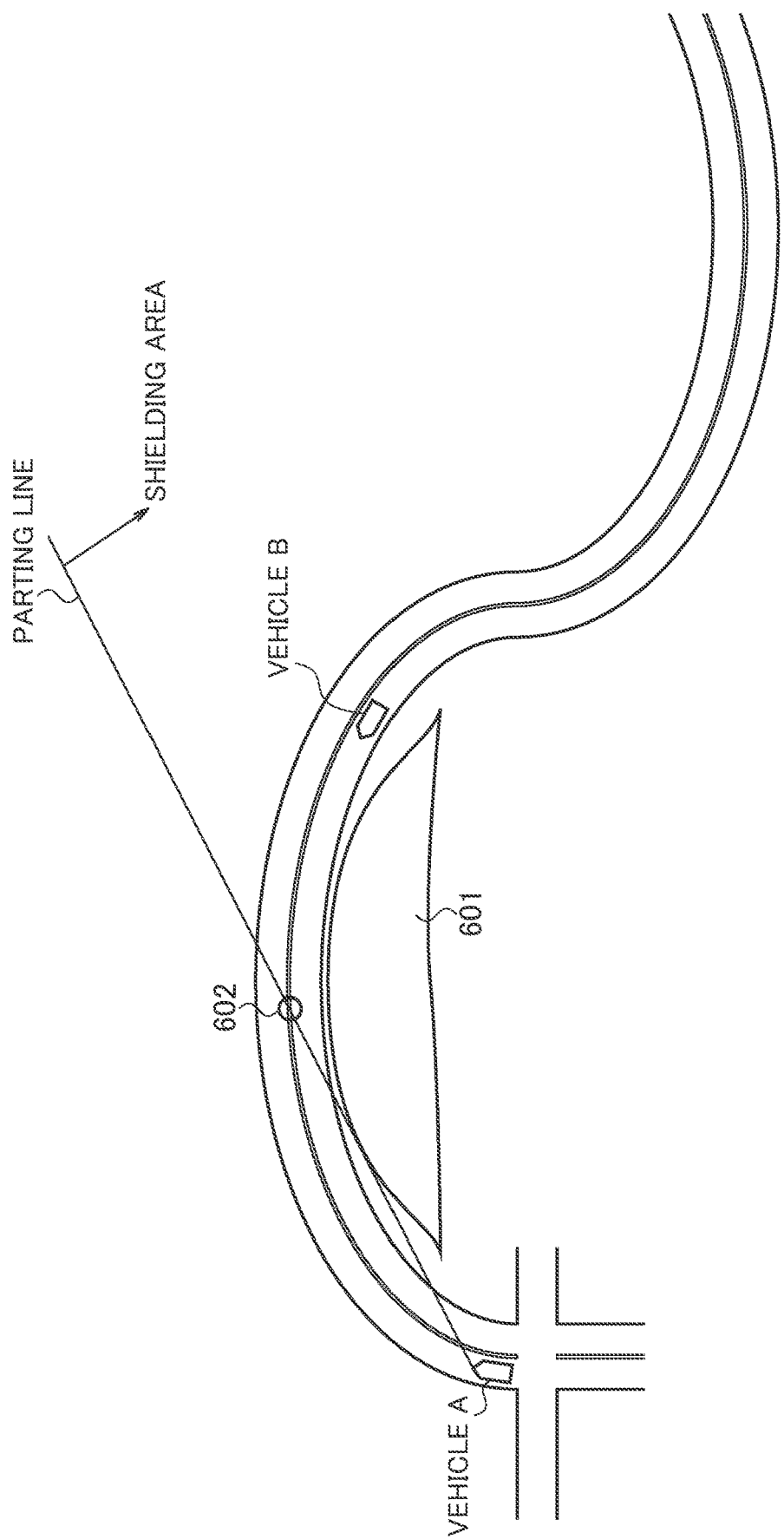
FIG. 10 is a diagram for explaining an example of a traveling scene according to a first modification of the second embodiment of the present invention.

As shown in FIG. 10, the shielding object judgment unit 405 acquires the mountainous area 601 from the map information. The mountainous area 601 exists around the vehicle A and the vehicle B. The shielding object judgment unit 405 sets a parting line in contact with the mountainous area 601 in the traveling direction of the vehicle A. In the scene shown in FIG. 10, an area on the mountainous area 601 side from the parting line is called a shielding area. In the scene shown in FIG. 10, the vehicle B exists in the shielding area. In this case, it is judged that the vehicle B is shielded by the mountainous area 601. The fact that the vehicle B is shielded by the mountainous area 601 means that the direct communication between the vehicle A and the vehicle B is difficult. In order to improve the efficiency of the calculation, the shielding object judgment unit 405 may calculate an intersection point 602 on the road intersecting the parting line, and judge that the vehicle B is shielded when the vehicle B exists farther from the intersection point 602 as viewed from the vehicle A. In the case of the ITS frequency (5.9 GHz band), for example, the range of the parting line is approximately 5 degrees based on the diffraction effect of the radio frequency. The mountainous area 601 may be detected by the sensor 102 or the sensor 202.

In this way, based on the information acquired from the map information (the mountainous area 601) or the object detected by the sensor 102 or the sensor 202 (the mountainous area 601), the shielding object judgment unit specifies the 1st area (shielding area) in which the direct communication between the vehicle A and the vehicle B is difficult. As a result, the shielding object judgment unit 405 can uniformly judge that the direct communication is difficult in an area exceeding the limit point where radio waves reach as seen from the vehicle A, thereby reducing the amount of calculation.

When the sensor 102 or the range detected by the sensor 202 includes any one of the intersection point, the curve, and the gradient inflection point, the shielding object judgment unit 405 may exclude a predetermined area based on any one of the intersection point, the curve, and the gradient inflection point from the 1st area to specify the second area. As a result, the shielding object judgment unit 405 can uniformly judge that the direct communication is difficult in an area exceeding the limit point where radio waves reach as seen from the vehicle A, thereby reducing the amount of calculation.

Second Modification of the Second Embodiment

The shielding area is not limited to that formed by the mountainous area 601. For example, as shown in FIG. 11, the shielding area can be formed even when a convex gradient exists in the following route.

Figure 11:
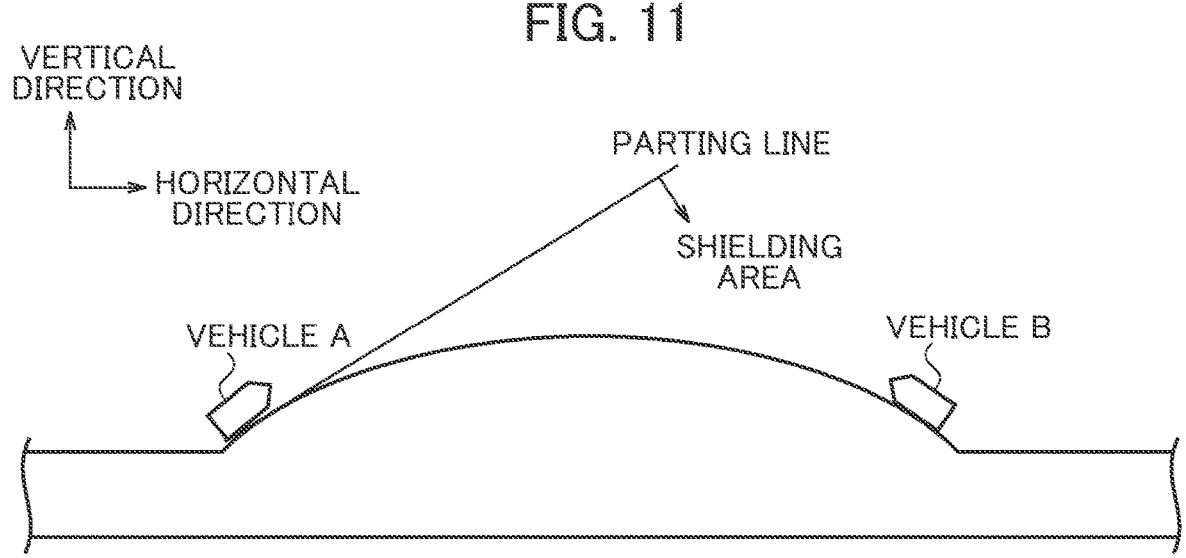
FIG. 11 is a diagram for explaining an example of a traveling scene according to a second modification of the second embodiment of the present invention.

In the scene shown in FIG. 11, the shielding object judgment unit 405 acquires the skew degree at the position of the vehicle A using map information. The shielding object judgment unit 405 sets a parting line along the acquired skew. The shielding object judgment unit 405 judges a region below the set parting line in the vertical direction as a shielding area. In the scene shown in FIG. 11, since the vehicle B exists in the shielding area, the direct communication between the vehicle A and the vehicle B is difficult. The range of the parting line is approximately 5 degrees as in the first modification.

Third Modification of the Second Embodiment

Figure 12:
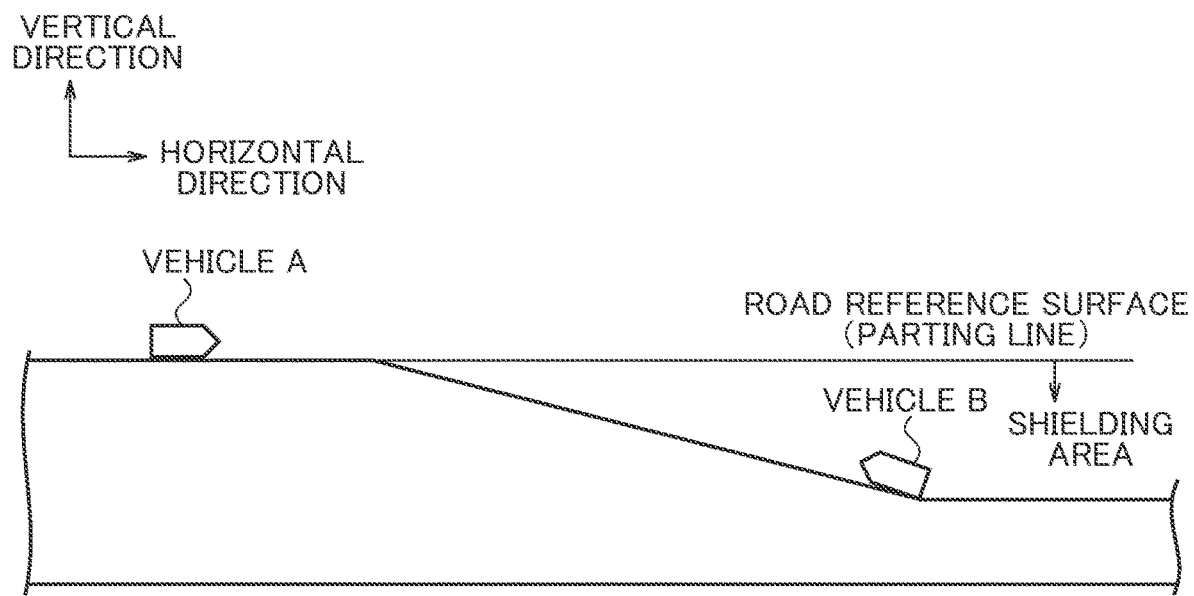
FIG. 12 is a diagram for explaining an example of a traveling scene according to a third modification of the second embodiment of the present invention.

Also, as shown in FIG. 12, the shielding area can be formed even when a gradient exists ahead of the following route.

In the scene shown in FIG. 12, the shielding object judgment unit 405 acquires a road reference plane at the position of the vehicle A using map information. The shielding object judgment unit 405 sets the acquired road reference plane as a parting line. The shielding object judgment unit 405 judges a region below the set parting line in the vertical direction as a shielding area. In the scene shown in FIG. 12, since the vehicle B exists in the shielding area, the direct communication between the vehicle A and the vehicle B is difficult. The range of the parting line is approximately 5 degrees as in the first modification.

Fourth Modification of the Second Embodiment

The shielding area may also be formed by large vehicles.

Figure 13:
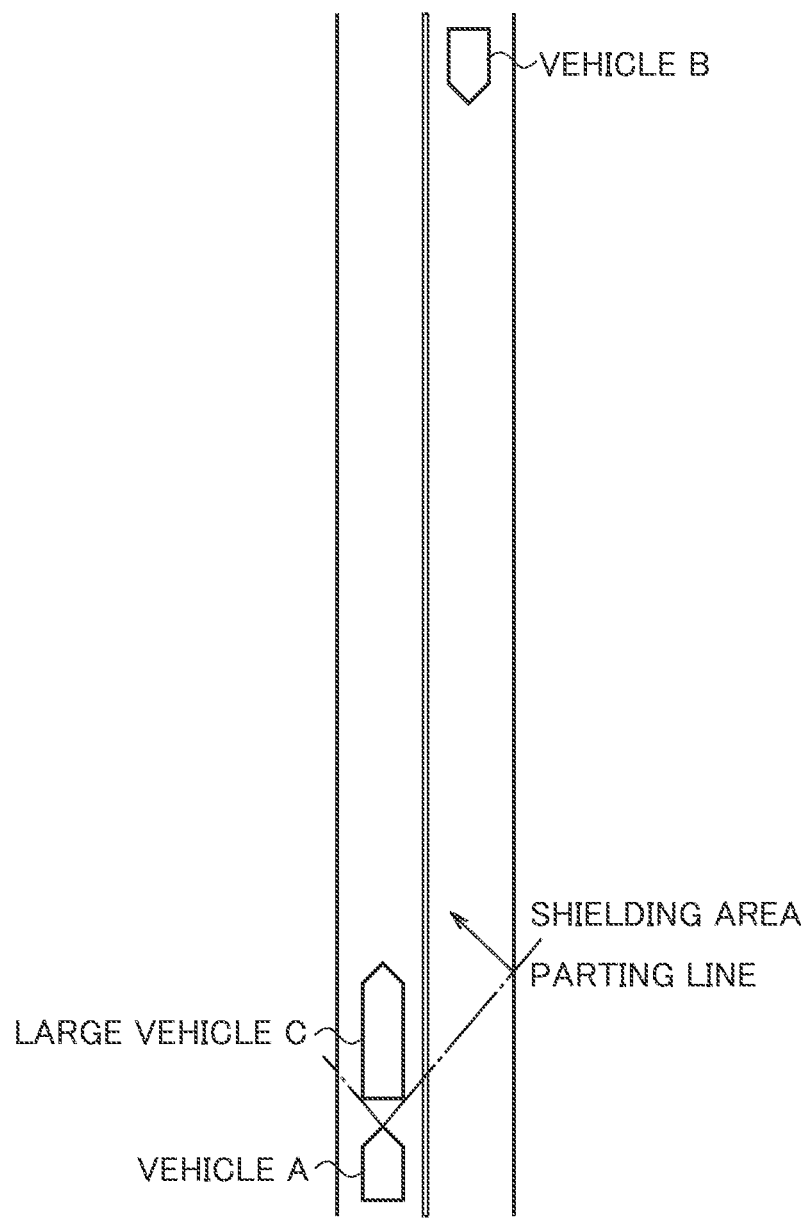
FIG. 13 is a diagram for explaining an example of a traveling scene according to a fourth modification of the second embodiment of the present invention.

As shown in FIG. 13, when the large vehicle C exists in front of the vehicle A, the shielding object judgment unit 405 sets the parting line from the position of the vehicle A and the detection range of the sensor 102. The parting line may be a line that forms a blind spot of the sensor 102. The shielding object judgment unit 405 judges an area on the side of the large vehicle C as a shielding area with respect to the set parting line. In the scene shown in FIG. 13, since the vehicle B exists in the shielding area, the direct communication between the vehicle A and the vehicle B is difficult. The range of the parting line is approximately 5 degrees as in the first modification.

Fifth Modification of the Second Embodiment

In the example shown in FIG. 7, the sensor 102 or the sensor 202 detects the large vehicle (the preceding vehicle C) on the following route, but the method for judging the presence of the large vehicle on the road or a route is not limited thereto. For example, when the congestion information is detected, the shielding object judgment unit 405 may judge that there is a large vehicle on the following route. The reason for this is that it has been found that, when a traffic jam occurs, large vehicles are traveling at a statistical value of approximately 10 to 25%.

Figure 14:
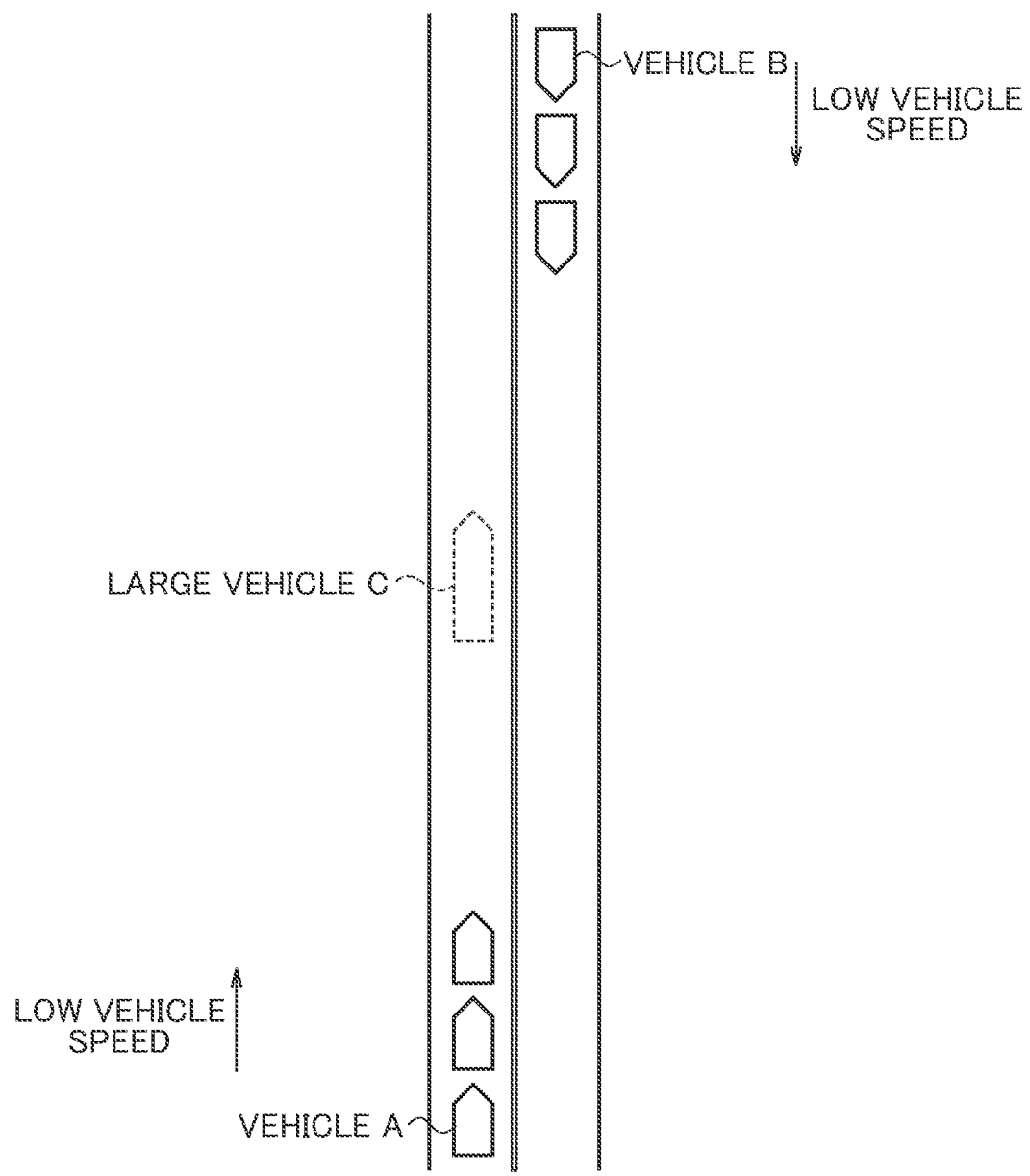
FIG. 14 is a diagram for explaining an example of a traveling scene according to a fifth modification of the second embodiment of the present invention.

As shown in FIG. 14, when the vehicle A and the vehicle B are traveling at a low vehicle speed, the shielding object judgment unit 405 may judge that there is the large vehicle on the following route. Low vehicle speed means a speed 25% or more lower than the speed limit. However, when there is an intersection or a curve between the vehicle A and the vehicle B, the shielding object judgment unit 405 does not use the low vehicle speed information but only the congestion information.

When the vehicle B receives the positional information from a vehicle different from the vehicle A, the large vehicle information is included in the message, and there is the large vehicle between the vehicle A and the vehicle B, the shielding object judgment unit 405 may judge that the large vehicle is on the following route 12.

Third Embodiment

Figure 15:
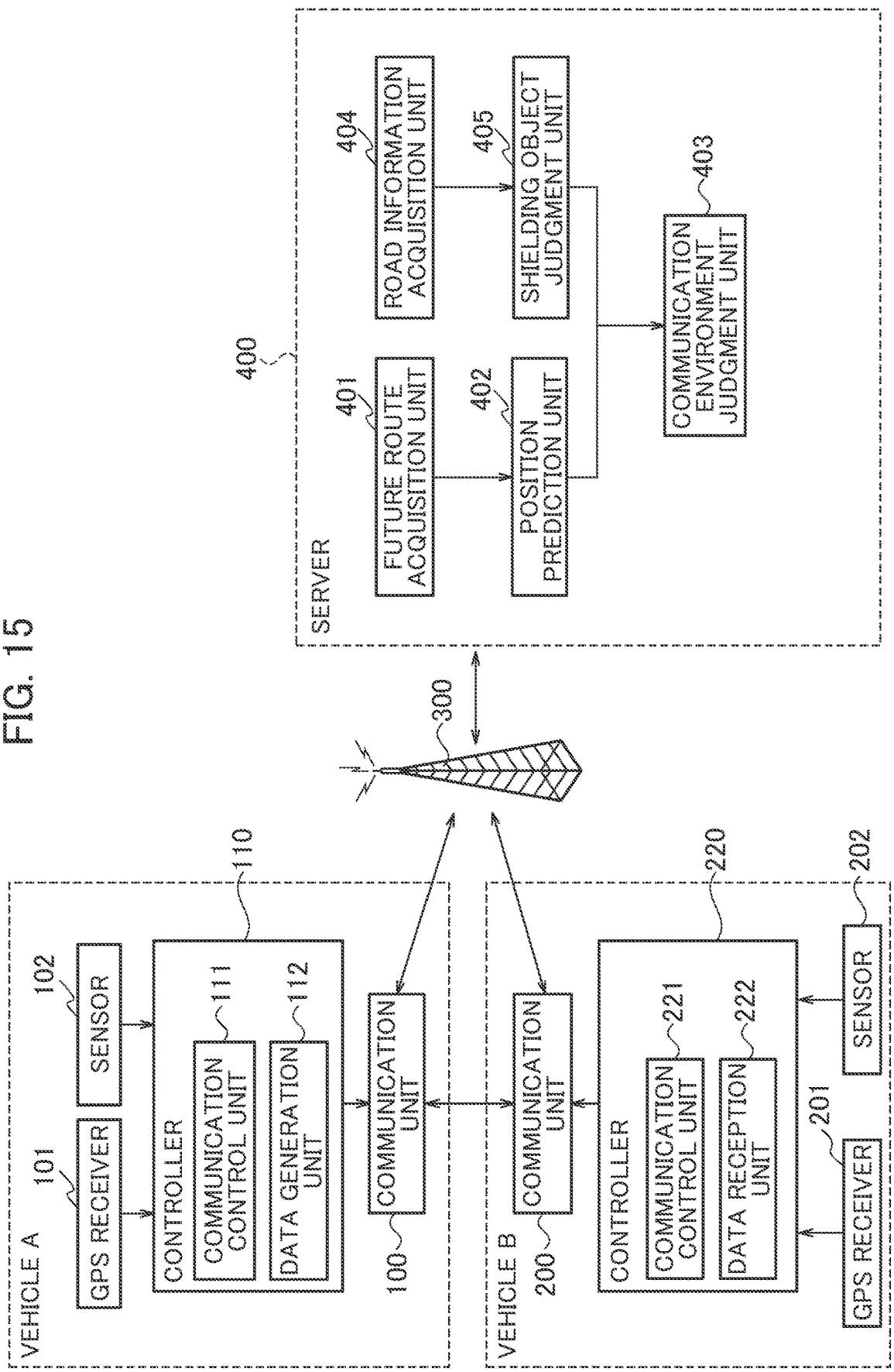
FIG. 15 is a schematic diagram of a vehicle and a server according to a third embodiment of the present invention.

Next, with referring to FIG. 15, the third embodiment of the present invention will be described. In the third embodiment, the vehicle A includes a data generation unit 112. The vehicle B includes a data reception unit 222. The same elements as in the second embodiment are indicated by the same reference numerals, and overlapping explanations are not repeated below. The main differences are as follows.

The data generation unit 112 generates a data to be transmitted to the vehicle B. The data generated by the data generation unit 112 includes overhead, vehicle information including current positional information of the vehicle A, sensor data, and the like. Hereinafter, the data generated by the data generation unit 112 may be expressed as a message. The overhead includes a message ID, a unique temporary ID of the vehicle A, an authentication code of the vehicle A, etc. The vehicle information includes, in addition to the current positional information of the vehicle A, speed information of the vehicle A, information on the traveling direction, and the like. The sensor data is data detected by the sensor 102. The sensor data includes identification numbers, positions, speeds, types (Cars), heights, traveling directions, past travel trajectories, future trajectories based on past travel trajectories, and the like of other vehicles. The transmission cycle of the message is not particularly limited, but is set to, for example, 10 Hz. The data generation unit 112 outputs the generated data to the communication unit 100. The data generation unit 112 may include entertainment information.

The data reception unit 222 has a function of previously storing the format of the data generated by the data generation unit 112, and interpreting and storing the data.

In the third embodiment, the vehicles A and B perform the direct communication when it is possible to perform the direct communication. On the other hand, when it is difficult to perform the direct communication, the vehicles A and B perform the indirect communication. An example of the indirect communication will now be described. In the third embodiment, the server 400 uses unicast communication or broadcast communication. In the case of unicast communication, the mobility service provider prepares a server 400 in advance and accesses a known representative IP address of the vehicle A in advance. The server 400 notifies a calculation resource for a time required for the vehicle A to pass a predetermined place (For example, an intersection), access information between the vehicle A and the vehicle B (a telephone number, an IP address, a temporary ID unique to the vehicle (ID used for V2V communication), an authentication code (public key, etc.), and current positional information. The mobility service provider issues an IP address and a public key accessible by the vehicle B to the vehicle A. Since this system can support information exchange by only a limited number of users, secrecy is maintained even when wide-area information is handled via the server 400, and since users using the server 400 are limited, cost collection and the like are facilitated.

As another example of the indirect communication, a case where broadcast communication with a limited area is used will be described. The public transportation infrastructure enterprise prepares a server 400 in advance, and accesses a known representative IP address of a vehicle A in advance. The server 400 acquires the current positions of the vehicles A and B, travel plan information, information on other accessible vehicles, and IP addresses, port numbers, and authentication information of other servers that can be distributed. Since this method is accessible by a wide range of users, information judged by each vehicle to be publicly available can be obtained from various vehicles. The access information of the server 400 is notified to the vehicle A.

Figure 16:
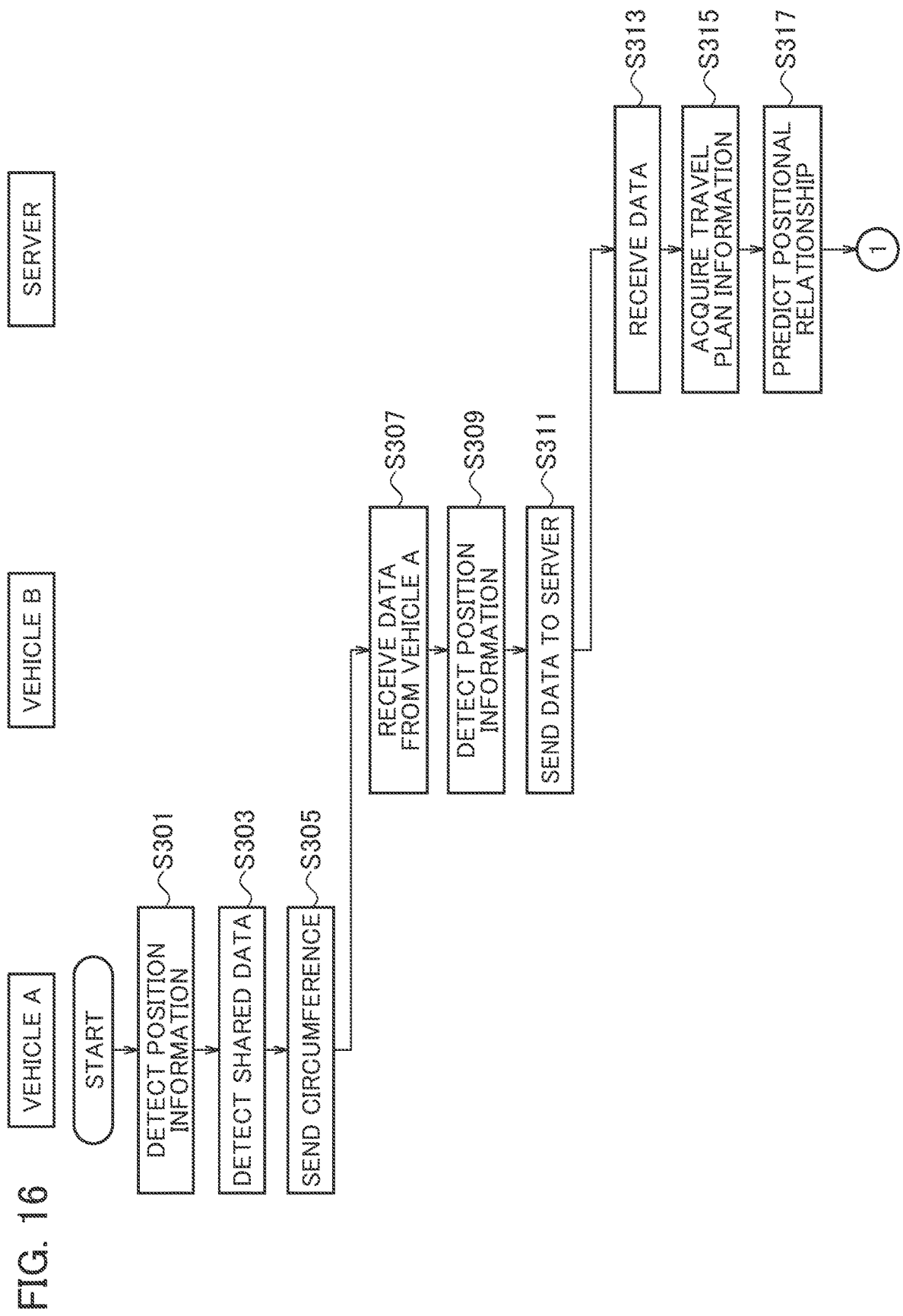
FIG. 16 is a flowchart illustrating an exemplary operation of the vehicle and the server according to the third embodiment of the present invention.
Figure 17:
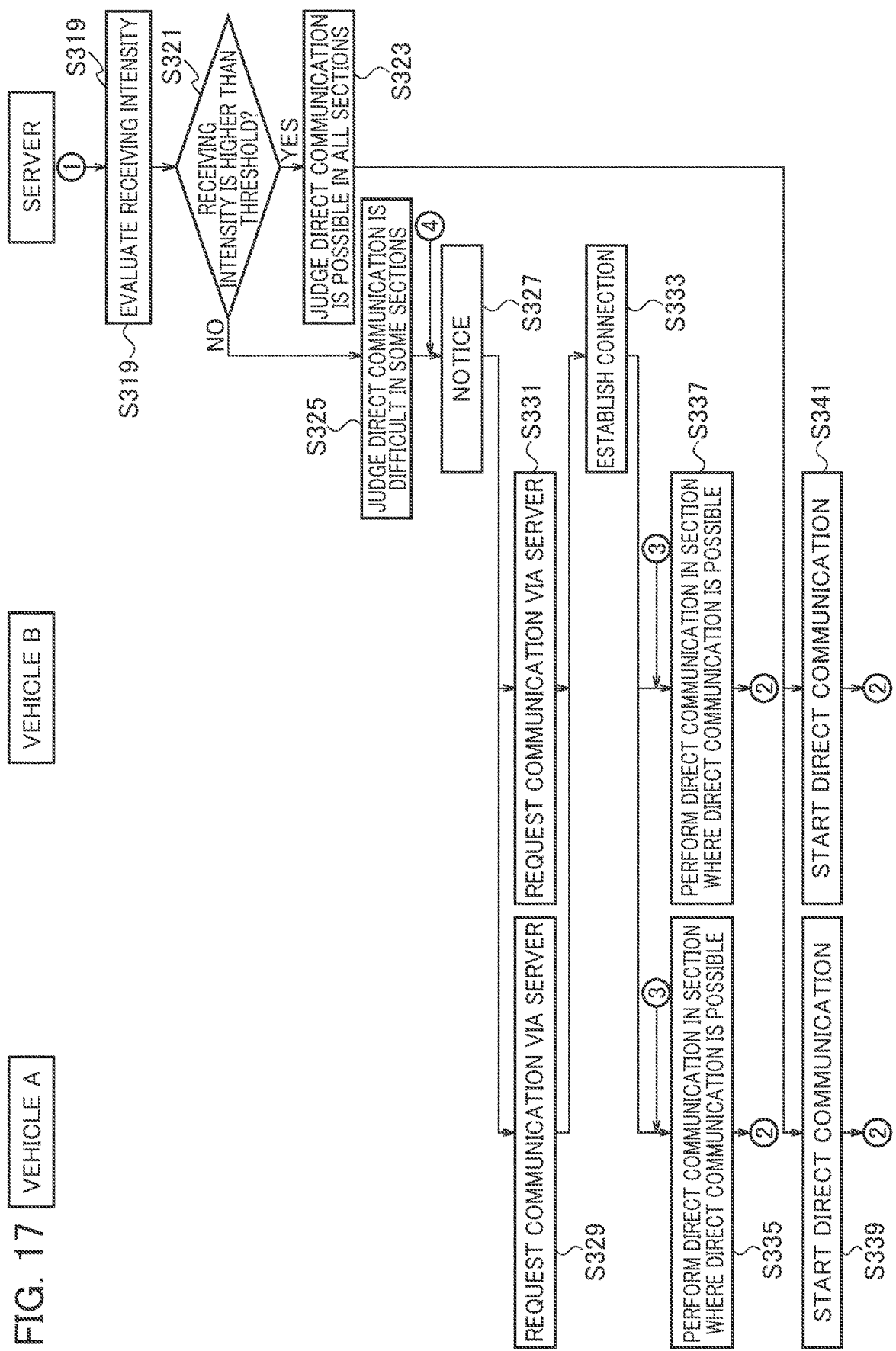
FIG. 17 is a flowchart illustrating an exemplary operation of the vehicle and the server according to the third embodiment of the present invention.
Figure 18:
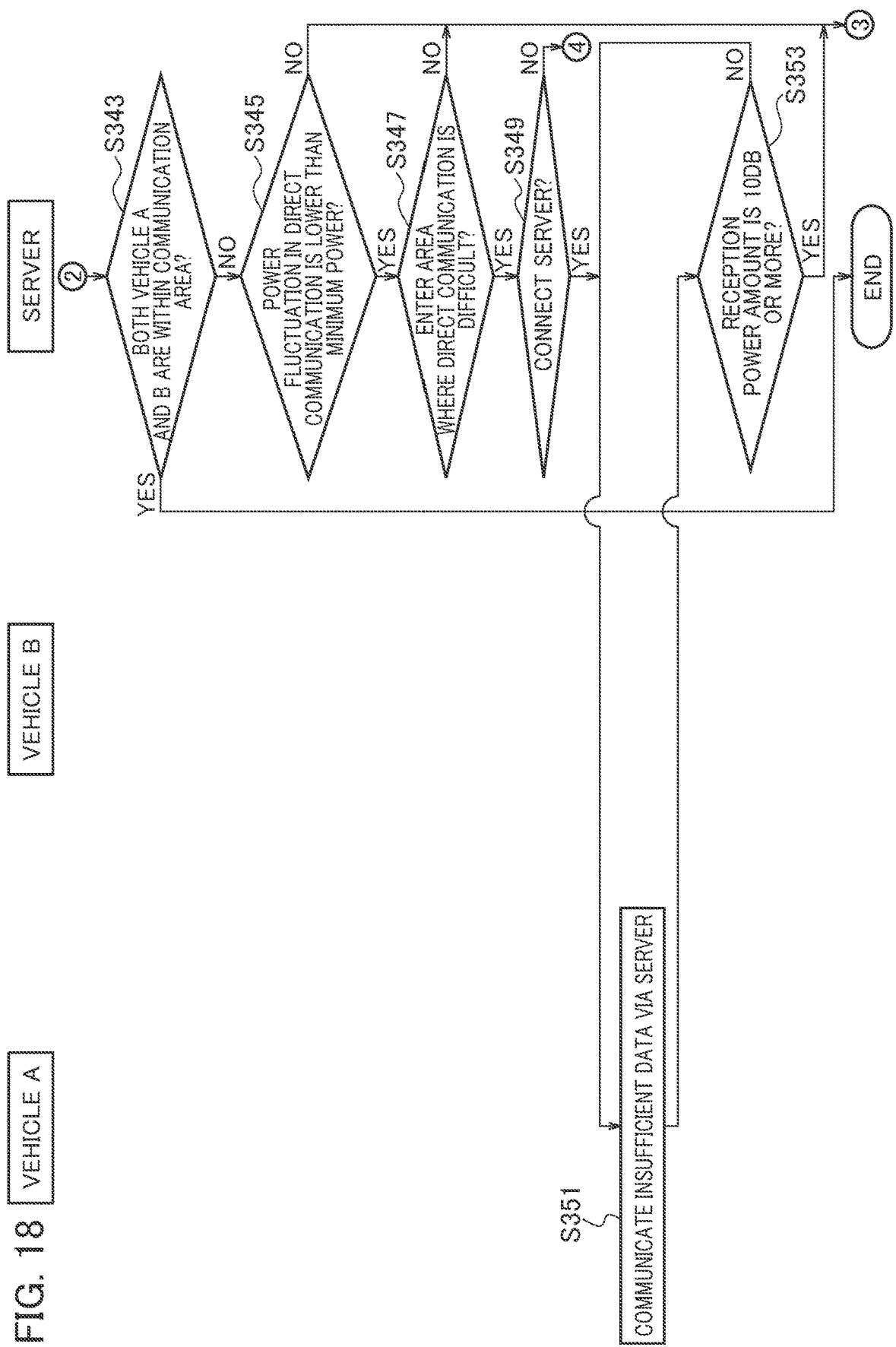
FIG. 18 is a flowchart illustrating an exemplary operation of the vehicle and the server according to the third embodiment of the present invention.

Next, with reference to a flowchart shown in FIGS. 16 to 18, an operation example of the vehicle A, the vehicle B, and the server 400 will be described. The process in steps S301, S305 to S323 is the same as the process in steps S101, S105 to S123 shown in FIGS. 4 to 5, and overlapping explanations are not repeated below.

Since it is judged in step S325 that it is difficult to perform the direct communication in some sections, the process proceeds to step S327. In step S327, the server 400 notifies the vehicle A and the vehicle B of access information for connection to the server 400.

The process proceeds to steps S329 and S331, in which the vehicles A and B request connection to the server 400 based on the access information acquired in step S327. The process proceeds to step S333, where the server 400 accepts the connection and distributes the necessary communication programs to the vehicles A and B. The communication program necessary for connection with the server 400 may be stored in advance in the vehicle A and the vehicle B. The server 400 transmits and receives the test signal to confirm the establishment of the connection. After the establishment of the connection is confirmed, the server 400 enters the standby mode.

The process proceeds to steps S335 and S337, in which the vehicle A and the vehicle B perform the direct communication in a section where the direct communication is possible. In steps S339 and S341, vehicles A and B communicate directly. After steps S335, S337, S339, and S341, the process proceeds to step S343.

In step S343, the server 400 judges whether or not the vehicle A and the vehicle B are in an area where the direct communication is possible. The area in which the direct communication is possible is, for example, an area in which the reception intensity exceeds a threshold value as described in the first embodiment. When the vehicle A and the vehicle B are in an area where the direct communication is possible (Yes in step S343), the series of processes ends. If the vehicle A and the vehicle B are not in an area where the direct communication is possible (No in step S343), the process proceeds to step S345.

In step S345, the server 400 judges whether or not the power fluctuation of the direct communication is observed to be less than the minimum power in the communication unit 100 of the vehicle A and the communication unit 200 of the vehicle B. With regard to the power of the direct communication measured every 10 Hz, standing waves may occur when waves overlap due to the influence of multiple reflections from urban canyon environments, road surfaces, etc., where buildings, etc. line up. When a standing wave occurs, the power fluctuation of the direct communication may be lower than the minimum power. If the power fluctuation of the direct communication falls below the minimum power, the modulation rate of the communication may become unable to receive all the data necessary for the downlink data communication rate to drop. If the power fluctuation of the direct communication is less than the minimum power (Yes in step S345), the process proceeds to step S347, where the server 400 judges whether the vehicle A and the vehicle B have entered an area where the direct communication is difficult. The area in which the direct communication is possible is, for example, an area in which the reception intensity is equal to or less than a threshold value as described in the first embodiment.

When the vehicle A and the vehicle B enter an area where the direct communication is difficult (Yes in step S347), the server 400 transmits a test signal so as to be in the always-connected mode, and judges whether or not the vehicle A and the vehicle B are connected. If the server 400 is connected to the vehicles A and B (Yes in step S349), the process proceeds to step S351, in which the vehicle A confirms that the received power amount of either the communication unit 100 or the communication unit 200 is less than 10 dB. Note that 10 dB is an example, and the present invention is not limited thereto. The vehicle A transmits the minimum throughput (10 MHz band: approximately 300 bytes per message) to the vehicle B by the direct communication. The minimum throughput includes a minimum basic message such as location information of the vehicle A. The vehicle A transmits the remaining data to the vehicle B via the server 400. Thereafter, the process proceeds to step S353. When the reception power amount of the communication unit 100 and the communication unit 200 is 10 dB or more, the reception duration is continued for approximately 10 seconds, and an area where the direct communication is difficult is not estimated in a future traveling area (Yes in step S353), the vehicle A and the vehicle B are switched to the direct communication. At this time, the connection with the server 400 is maintained.

[Operational Advantage]

According to the third embodiment, the future communication environment is judged, and it is judged whether or not the amount of data to be transmitted can be transmitted by the direct communication. If the amount of data to be transmitted cannot be transmitted by the direct communication, the vehicles A and B can be connected to the indirect communication in advance before disconnecting the direct communication. As a result, the time required for initial connection when switching from the direct communication to the indirect communication is reduced, and smooth data sharing is realized.

The respective functions described in the above embodiment can be implemented in single or plural processing circuits. The respective processing circuits include a programmed processing device, such as a processing device including an electric circuit. The respective processing circuits also include an application-specific integrated circuit (ASIC) configured to execute the functions described above, and other devices such as circuit components.

While the present invention has been described above by reference to the embodiment, it should be understood that the present invention is not intended to be limited to the descriptions and the drawings composing part of this disclosure. Various alternative embodiments, examples, and technical applications will be apparent to those skilled in the art according to this disclosure.

Figure 19:
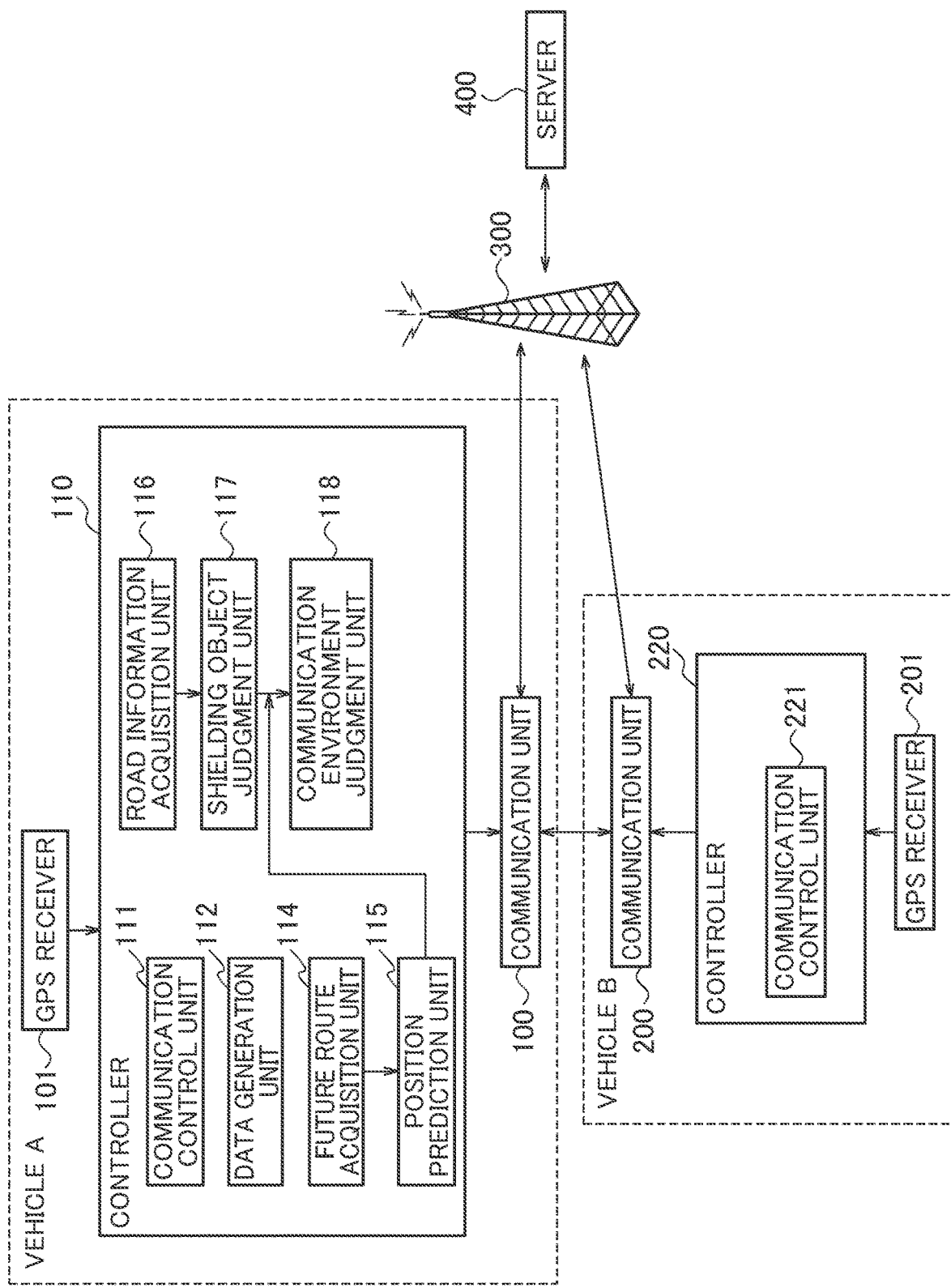
FIG. 19 is a schematic diagram of the vehicle and the server according to another embodiment of the present invention.

In the above-described embodiment, judgment of the communication environment, correction of the communication environment, and the like are performed by the server 400, but the present invention is not limited thereto. For example, as shown in FIG. 19, judgment of the communication environment, preparation of correction of the communication environment, and the like may be performed by the vehicle A. As shown in FIG. 19, the functions of the future route acquisition unit 114, the position prediction unit 115, the road information acquisition unit 116, the shielding object judgment unit 117, and the communication environment judgment unit 118 included in the controller 110 of the vehicle A are the same as the functions of the future route acquisition unit 401, the position prediction unit 402, the road information acquisition unit 404, the shielding object judgment unit, and the communication environment judgment unit 403 shown in FIG. 6.

When the vehicle A corrects the current communication environment and judges the future communication environment between the vehicle A and the vehicle B based on the corrected current communication environment, the vehicle A may transmit information indicating the future communication environment to the vehicle B. The vehicle A may switch the communication destination from the vehicle B to another device (For example, server 400) according to the judged future communication environment. As a result, the time required for initial connection when switching from the direct communication to the indirect communication is reduced, and smooth data sharing is realized.

The judgment of the communication environment and the correction of the communication environment may be performed by the vehicle B. Alternatively, the judgment of the communication environment, the correction of the communication environment, and the like may be performed by a mobile edge computer on the cellular network or by a server on the internet.

In the present embodiment, communication conforming to the communication standard used in the cellular network is used for the direct communication. Thus, the cost is reduced as compared with the case of preparing a new communication standard.

The communication environment includes at least one of the following characteristics: reception intensity, moving speed, and multiple reflection.

REFERENCE SIGNS LIST 100 communication unit
101 GPS receiver
102 sensor
110 controller
111 communication control unit
112 data generation unit
114 future route acquisition unit
115 position prediction unit
116 road information acquisition unit
117 shielding object judgment unit
118 communication environment judgment unit
200 communication unit
201 GPS receiver
202 sensor
220 controller
221 communication control unit
222 data reception unit
300 base station
310 cellular network
400 server
401 future route acquisition unit
402 position prediction unit
403 communication environment judgment unit
404 road information acquisition unit
405 shielding object judgment unit

The invention claimed is:

1. An information processing device comprising:
a communication unit mounted on a moving object and communicates with the moving object and another moving object;
a GPS receiver that detects a position of the moving object;
a sensor comprising a camera and a light detection and ranging (LiDAR) system, wherein the sensor is configured to detect and identify a type of an object on or around the road as object data, and
a controller that controls the communication performed by the communication unit, wherein the controller is configured to:
acquire a first future position where the moving object travels in the future based on, at least in part, the position of the moving object;
acquire a second future position where the another moving object travels in the future;
acquire a first future route that the moving object will travel in the future and a second future route that the another moving object will travel in the future;
acquire a positional relationship between the moving object and the another moving object based on the first future route and the second future route;
acquire map information based on the first future route and the second future route;
determine a presence and a type of a shielding object including a vehicle based on the positional relationship, map information, and object data;
determine a corrected radio wave intensity between the moving object and the another moving object along the first future route and the second future route, wherein determining the corrected radio wave intensity comprises adjusting a radio intensity with a shielding attenuation factor based on the presence and the type of the shielding object;
determine a data transmission/reception rate that the moving object will transmit to or receive from the another moving object;
determine, based on the data transmission/reception rate, a minimum reception power;
determine, by comparison of the corrected radio wave intensity to a threshold based on the minimum reception power, whether direct communication between the moving object and the another moving object is difficult in a section of the first and second future routes; and
execute indirect communication at a timing corresponding to the section in response to a determination that direct communication is difficult in the section,
wherein steps to execute indirect communication comprise:
receiving access information for connection to a server,
connecting to the server using the access information, wherein connecting to the server comprises receiving and transmitting a test signal from and to the server to confirm the connection, and
transmitting or receiving data to or from the another moving object via the server.

2. The information processing device according to claim 1, wherein the controller being configured to:
predict the first future position of the moving object in the acquired first future route; and
predict the second future position of the another moving object in the acquired second future route.

3. The information processing device according to claim 1, wherein
the corrected radio wave intensity is determined further based on a relative distance between the moving object and the another moving object in the future, wherein the relative distance is specified by the first future position and the second future position.

4. The information processing device according to claim 1, wherein the corrected radio wave intensity is determined further based on:
a straight route connecting the first future position and the second future position in a straight line and a following route that connects, along a road, the moving object and the another moving object along the first future route and the second future route.

5. The information processing device according to claim 1, wherein
the controller being configured to:
acquire an amount of data that the moving object will transmit to or receive from the another moving object in the future;
determine whether or not it is possible to transmit or receive the amount of data in a future communication environment based on the corrected radio wave intensity.

6. The information processing device according to claim 1, wherein
the communication unit communicates directly with the another moving object using a communication that conforms to a communication standard used in a cellular network.

7. The information processing device according to claim 1, wherein
the corrected radio wave intensity is determined further based on a current communication environment and a future communication environment each comprising at least one of a reception intensity, a moving speed, and a multiple reflection.

8. The information processing device according to claim 1, wherein
the controller being configured to:
transmit an information indicating the execution of indirect communication to the another moving object in response to the determination that direct communication is difficult in the section.

9. The information processing device according to claim 1, wherein
the controller is further configured to specify a first area where it is difficult to communicate directly with the another moving object based on the map information or the object data.

10. The information processing device according to claim 9, wherein
in response to a range detected by the sensor that includes an intersection, a curve, or a gradient inflection point, the controller is further configured to specify a second area by excluding a predetermined area based on one of the intersection, the curve, or the gradient inflection point from the first area.

11. The information processing device according to claim 1, wherein
determining the corrected current radio wave intensity further comprises multiplying a distance attenuation by the shielding attenuation factor.

12. The information processing device according to claim 1, wherein the sensor further comprises one or more of:
a wheel speed sensor,
a steering angle sensor,
a gyro sensor,
a radar system,
a laser range finder, and
a sonar system.

13. The information processing device according to claim 1, wherein
the sensor is further configured to determine a three-dimensional dataset indicative of one or more of a shape and a proximity of the object.

14. The information processing device according to claim 1, wherein the position is specified using a latitude and a longitude.

15. The information processing device according to claim 1, wherein the controller is further configured to:
determine, while executing direct communication with the another moving object, whether a power fluctuation of the direct communication is less than a minimum power; and
in response to determining that the power fluctuation is less than the minimum power:
transmit a minimum throughput data to the another moving object using the direct communication; and
transmit a remaining data to the another moving object via the server,
wherein the remaining data is data to be transmitted to the another moving object that excludes the minimum throughput data.

16. An information processing method of an information processing device comprising:
a communication unit mounted on a moving object and communicates with the moving object and another moving object;
a GPS receiver that detects a position of the moving object;
a sensor comprising a camera and a light detection and ranging (LiDAR) system, wherein the sensor is configured to detect and identify a type of an object on or around a road as object data; and
a controller that controls the communication performed by the communication unit, the method comprising:
acquiring a first future position where the moving object travels in the future based on, at least in part, the position of the moving object;
acquiring a second future position where the another moving object travels in the future;
acquiring a first future route that the moving object will travel in the future and a second future route that the another moving object will travel in the future;
acquiring a positional relationship between the moving object and the another moving object based on the first future route and the second future route;
acquiring map information based on the first future route and the second future route;
determining a presence and a type of a shielding object including a vehicle based on the positional relationship, map information, and object data;
determining a corrected radio wave intensity between the moving object and the another moving object along the first future route and the second future route, wherein determining the corrected radio wave intensity comprises adjusting a radio intensity with a shielding attenuation factor based on the presence and the type of the shielding object;
determining a data transmission/reception rate that the moving object will transmit to or receive from the another moving object;
determining, based on the data transmission/reception rate, a minimum reception power;
determining, by comparison of the corrected radio wave intensity to a threshold based on the minimum reception power, whether direct communication between the moving object and the another moving object is difficult in a section of the first and second future routes; and
executing indirect communication at a timing corresponding to the section in response to a determination that direct communication is difficult in the section,
wherein steps for executing indirect communication comprise:
receiving access information for connection to a server,
connecting to the server using the access information, wherein connecting to the server comprises receiving and transmitting a test signal from and to the server to confirm the connection, and
transmitting or receiving data to or from the another moving object via the server.

17. The information processing method according to claim 16, further comprising:
determining, while executing direct communication with the another moving object, whether a power fluctuation of the direct communication is less than a minimum power; and
in response to determining that the power fluctuation is less than the minimum power:
transmitting a minimum throughput data to the another moving object using the direct communication, and
transmitting a remaining data to the another moving object via the server,
wherein the remaining data is data to be transmitted to the another moving object that excludes the minimum throughput data.

18. A server for indirect communication between a moving object and another moving object via a fixed and non-moving communication device, the server being configured to:
acquire a first future position where the moving object travels in the future based on, at least in part, a position of the moving object, wherein the position is detected with a GPS receiver of the moving object;
acquire a second future position where the another moving object travels in the future;
acquire a first future route that the moving object will travel in the future and a second future route that the another moving object will travel in the future;
acquire data from a sensor comprising a camera and a light detection and ranging (LiDAR) system, wherein the sensor is configured to detect and identify a type of an object on or around a road as object data;
acquire a positional relationship between the moving object and the another moving object based on the first future route and the second future route;
acquire map information based on the first future route and the second future route;
determine a presence and a type of a shielding object including a vehicle based on the positional relationship, map information, and object data;
determine a corrected radio wave intensity between the moving object and the another moving object along the first future route and the second future route, wherein determining the corrected radio wave intensity comprises adjusting a radio intensity with a shielding attenuation factor based on the presence and the type of the shielding object;

determine a data transmission/reception rate that the moving object will transmit to or receive from the another moving object;

determine, based on the data transmission/reception rate, a minimum reception power;

determine, by comparison of the corrected radio wave intensity to a threshold based on the minimum reception power, whether direct communication between the moving object and the another moving object is difficult in a section of the first and second future routes; and execute indirect communication at a timing corresponding to the section in response to a determination that direct communication is difficult in the section, wherein steps to execute indirect communication comprise:

transmitting access information for connection to the server to one or more of the moving object and the another moving object, connecting, by a reception of the access information, to the moving object and the another moving object, wherein connecting to the moving object and the another moving object comprises transmitting and receiving a test signal to each of the moving object and the another moving object to confirm the connection, and transmitting data between the moving object and the another moving object.

19. The server according to claim 18, further configured to:

determine whether a power fluctuation of a direct communication between the moving object and the another moving object is less than a minimum power; and transmit a remaining data between the moving object and the another moving object in response to determining that the power fluctuation is less than the minimum power, wherein the remaining data is data to be transmitted from the moving object to the another moving object that is excluded from the direct communication between the moving object and the another moving object.

* * * * *